United States Patent
Rabasco et al.

(10) Patent No.: US 7,189,461 B2
(45) Date of Patent: *Mar. 13, 2007

(54) SEMI-CRYSTALLINE ETHYLENE VINYL ACETATE EMULSION POLYMERS FOR HEAT SEAL APPLICATIONS

(75) Inventors: John Joseph Rabasco, Allentown, PA (US); Christian Leonard Daniels, Macungie, PA (US); David William Horwat, Emmaus, PA (US); Menas Spyros Vratsanos, Breinigsville, PA (US); Richard Henry Bott, Macungie, PA (US)

(73) Assignee: Air Products Polymers, L.P., Allentown, PA (US)

( * ) Notice: Subject to any disclaimer, the term of this patent is extended or adjusted under 35 U.S.C. 154(b) by 167 days.

This patent is subject to a terminal disclaimer.

(21) Appl. No.: 10/378,996

(22) Filed: Mar. 4, 2003

(65) Prior Publication Data

US 2004/0175589 A1    Sep. 9, 2004

(51) Int. Cl.
  B32B 27/00    (2006.01)
  B05D 1/40    (2006.01)
  B05D 3/02    (2006.01)
  C08F 2/16    (2006.01)

(52) U.S. Cl. .................. 428/500; 427/532; 427/541; 427/331; 427/372.2; 427/384; 427/388.4; 427/391; 427/395; 524/458

(58) Field of Classification Search ........... 524/458, 524/517; 427/532, 541, 331, 372.2, 384, 427/388.4, 391, 395; 428/500
See application file for complete search history.

(56) References Cited

U.S. PATENT DOCUMENTS

| | | | |
|---|---|---|---|
| 3,226,352 A | 12/1965 | Helin et al. ............... 260/29.6 |
| 3,355,322 A | 11/1967 | Worrall et al. ............. 117/126 |
| 3,436,363 A | 4/1969 | Helin ........................ 260/29.6 |
| 3,692,723 A | 9/1972 | Kasagi et al. ........... 260/29.6 E |
| 4,128,518 A | 12/1978 | Oyamada et al. ... 260/29.6 WB |
| 5,747,578 A | 5/1998 | Schmitz et al. ............. 524/502 |
| 5,872,181 A | 2/1999 | Daniels et al. ............. 524/563 |
| 6,197,865 B1 | 3/2001 | Koizumi et al. | |
| 6,319,978 B1 | 11/2001 | Daniels et al. ............. 524/564 |
| 6,559,259 B2 * | 5/2003 | Kohlhammer et al. ...... 526/287 |
| 7,029,725 B2 * | 4/2006 | Pepe et al. .................. 427/393 |

FOREIGN PATENT DOCUMENTS

| | | |
|---|---|---|
| JP | 56-82837 | 12/1979 |
| JP | 57-65708 | 4/1982 |
| JP | 2002-32216 | 11/2002 |
| JP | 02322216 | 11/2002 |
| WO | 0242342 | 5/2002 |
| WO | 02079270 | 10/2002 |

* cited by examiner

Primary Examiner—Sheeba Ahmed
(74) Attorney, Agent, or Firm—Mary E. Bongiorno; Russell L. Brewer

(57) ABSTRACT

This invention is directed to aqueous-based ethylene-vinyl acetate (EVA) polymer emulsions suited for use in heat seal applications. The EVA polymers of this invention are produced by a relatively low-pressure process, i.e., less than 2000 psig, preferably from about 1000 to about 2000 psig. The aqueous-based EVA based polymer emulsions contain crystalline segments resulting from ethylene linkages and are prepared by emulsion polymerizing ethylene and vinyl acetate, preferably with a carboxylic monomer, in the presence of a stabilizing system containing surfactant or a cellulosic protective colloid in combination with surfactant.

24 Claims, No Drawings

SEMI-CRYSTALLINE ETHYLENE VINYL ACETATE EMULSION POLYMERS FOR HEAT SEAL APPLICATIONS

BACKGROUND OF THE INVENTION

Aqueous dispersions of copolymers of vinyl acetate and ethylene are known. Typically, copolymers are considered high ethylene copolymers when they have an ethylene content in excess of 40% by weight and often greater than 50% by weight of the polymer. They are commonly referred to as EVA copolymers whereas those having less than 50% ethylene by weight are typically referred to as VAE copolymers. One method for preparing the high ethylene content copolymer emulsions is to polymerize vinyl acetate and ethylene in the presence of a solvent and then mechanically emulsify the resulting polymer. Another method for forming copolymers of vinyl acetate and ethylene is to effect emulsion polymerization of vinyl acetate and ethylene under high pressure in the presence of water and a stabilizing medium.

Many uses have been ascribed to EVA polymers including use as coatings, pressure sensitive adhesives, paper saturation binders, repulpable paper coatings, adhesive binders, and so forth. One of the suggested uses for EVA polymers is in heat seal applications. Aqueous emulsions are coated onto a substrate, e.g., paperboard stock, and dried and often these substrates are rolled for storage and transport. At the site of manufacture of finished products, the paperboard stock having the polymer adhered thereto is affixed or laminated to a surface and heated sufficiently to melt the polymer and effect a seal.

To have good market acceptance for use in heat seal adhesive applications the polymers should have a proper balance of heat seal adhesive characteristics and non-block characteristics. Ideally, a good heat seal adhesive should be capable of forming a good bond at moderately low temperatures, e.g., less than 109° C., preferably less than 99° C. This affords the convertor the ability to run rapid line speeds without the need for excessive heat. Lower temperatures also reduce the risk of operator injury due to burns and minimize substrate damage that would occur at higher temperatures. A good heat seal adhesive must remain non-blocking at ambient temperatures, i.e., those temperatures experienced in non-climate controlled warehouses and trucks, e.g., 35° C. and up.

Two additional requirements for polymers employed in heat seal applications are clarity and hot green strength. Clarity is required in applications such as in heat-sealing of blister pack films. The substrate films are clear and heat seal adhesives that form opaque bonds or lead to discoloration are unsuited for this application. Hot green strength is defined as the strength of the bond as judged by peel adhesion immediately after forming the bond in the heat sealing process. If a polymer does not exhibit hot green strength, the adhesive bond could fail as the part exits the heat sealer and becomes subjected to stresses as it moves along the production line.

Representative processes for producing VAE and EVA polymers are disclosed in the following patents.

U.S. Pat. No. 3,226,352 discloses the batchwise polymerization of ethylene in the presence of water and a nonionic emulsifier system containing an alkylphenoxy polyoxyethylene ethanol emulsifier. The products are characterized by good stability and are odorless, colorless, milky, low viscosity liquids. Emulsifier levels of 15 to 20% by weight relative to total polymer are used to produce solids levels in excess of 25%. The emulsions are reported to be useful in textile finishing, polishes, printing inks, and surface coatings.

U.S. Pat. No. 3,436,363 discloses a batchwise and a continuous process for the polymerization of ethylene in the presence of a polymerizable ethenoid unsaturated mono or polybasic carboxylic acid or sulfonic acid and water. Representative polymerizable ethenoid acids include acrylic, methacrylic, crotonic, itaconic, and the like. The solids level of the polymer emulsions is about 25 to 30% by weight. The emulsions are reported to be useful in paper coating, textile finishing, polishes, and surface coatings.

U.S. Pat. No. 3,355,322 discloses a batchwise process for forming vinyl acetate-ethylene emulsions containing from 20 to 70%, typically 25 to 60% ethylene for use as coatings for paper or as surface coatings. Polymers having an ethylene content of about 30% by weight precipitated on addition of a saturated aqueous salt solution of sodium bicarbonate and were found to have a melt index of 155 g per 10 minutes at a temperature of 190° C.

U.S. Pat. No. 3,692,723 discloses a process for producing heat melting adhesives by the emulsion polymerization of vinyl acetate and ethylene having 30 to 98% ethylene in the presence of poly(vinyl alcohol), a nonionic surfactant having an HLB of from 16–21 and at least one anionic surfactant selected from the group consisting of a sodium, potassium or ammonium salt of lauryl alcohol sulfuric acid ester or a sodium salt of dodecylbenzenesulfonic acid.

U.S. Pat. No. 4,128,518 discloses a process for producing pressure sensitive adhesives comprising an aqueous emulsion of vinyl acetate-ethylene polymer having an ethylene content of 15 to 40% by weight. It is reported that when the ethylene content is above 40% by weight, crystallizability of ethylene appears and the pressure sensitive adhesive is hard and has inferior tackiness and adhesion force.

U.S. Pat. No. 5,747,578 discloses a copolymer in dispersion or redispersible powder form which is stabilized by a protective colloid. It has a $T_g$ of −40 to 10° C. and an ethylene content of at least 30% by weight. The copolymer is prepared by copolymerizing vinyl acetate and ethylene under conditions for forming a first polymer phase having greater than 40% by weight of ethylene and then forming a second copolymer phase, which includes vinyl acetate and having up to 40% by weight of ethylene, based on total amount of monomers. The copolymers are reported to be useful as binders in building material formulations.

U.S. Pat. No. 5,872,181 discloses aqueous vinyl acetate-ethylene polymer adhesives for use in packaging applications and for bonding difficult to bond surfaces. The polymers contain 55–80 wt % vinyl acetate, 15–45 wt % ethylene, and 0 to 30 wt % one or more other ethylenically unsaturated copolymerizable monomer. The polymers are produced by emulsion polymerization using a stabilizer system of poly(vinyl alcohol) as a protective colloid and a surfactant.

U.S. Pat. No. 6,319,978 discloses pressure sensitive vinyl acetate—ethylene-carboxyl based adhesives comprising a high (45–55 wt %) ethylene content emulsion polymer having a $T_g$ of from −25 to −70° C. The high ethylene content emulsion are formulated to be tacky to the touch at room temperature.

WO 02/42342 (2002) discloses ethylene-vinyl acetate emulsion polymers having at least 55% by weight ethylene, which is water dispersible, yet non-dispersible in an aqueous solution containing 0.5% or more of an inorganic salt. The emulsion polymers are stabilized with a hydrophilic polymeric colloid, e.g., polyacrylic acid. The polymers are reported to be useful in producing environmentally friendly products, such as flushable hygienic products. The high ethylene content emulsion is designed to be tacky to the touch at room temperature.

WO 02/079,270 discloses high ethylene/vinyl acetate copolymers formed by polymerizing ethylene and vinyl acetate in the presence of a hydrophilic colloid without a carboxylic acid monomer. The high ethylene content emulsion is designed to be tacky to the touch at room temperature.

JP2002322216A discloses a method for forming an ethylene-vinyl acetate polymer using a redox system where ethylene is the main component. The polymer is formed by emulsion polymerization in the presence of poly(vinyl alcohol). Persulfate and sodium hydrogen sulfite is used as the initiating system. The vinyl acetate content was maintained at a level of about 3% by weight during polymerization.

BRIEF SUMMARY OF THE INVENTION

This invention is directed to aqueous-based ethylene-vinyl acetate (EVA) polymer emulsions suited for use in heat seal applications. Preferably the EVA polymer emulsions form clear films. EVA is being used in this invention to indicate polymers with any level of ethylene, such as, from 10 to 85 wt % of the polymer. The EVA polymers of this invention are produced by a relatively low-pressure process, i.e., less than 2000 psig (13,891 kPa), preferably from about 1000 (6,996 kPa) to about 2000 psig (18,891 kPa). The aqueous-based EVA based polymer emulsions contain crystalline segments resulting from ethylene linkages and are prepared by emulsion polymerizing ethylene and vinyl acetate, preferably with a carboxylic monomer, in the presence of a stabilizing system consisting essentially of a surfactant or a cellulosic protective colloid in combination with a surfactant.

The EVA polymers of this invention have:
(a) a crystalline melting point ($T_m$) ranging from 35 to 110° C., preferably 50 to 90° C.; measured at a heat rate of 20° C./minute and,
(b) a tensile storage modulus of at least $1 \times 10^5$ dynes/cm² at 115° C. measured at 6.28 rad/sec.

In addition, they should have (c) a crystalline heat of fusion ($H_f$) ranging from 5 to 100 joules per gram (J/g), preferably 15 to 70 J/g; (d) a glass transition temperature ($T_g$) of +25° C. to about −35° C., and e) be non-blocking at temperatures of about 50° C.

DETAILED DESCRIPTION OF THE INVENTION

The aqueous based EVA polymer emulsions of this invention are based upon vinyl acetate and ethylene with the level of polymerized units of vinyl acetate ranging from 15 to 90% by weight of the polymer and the level of polymerized units of ethylene ranging from 10% to 85% by weight; preferably from 25 to 80 weight percent vinyl acetate and 20 to 75% by weight ethylene; and most preferably from 35 to 75% by weight vinyl acetate and 25 to 65% by weight ethylene. Another embodiment of this invention is aqueous based EVA polymer emulsions in which the EVA polymer is comprised of 30 to 50 wt % vinyl acetate and 50 to 70 wt % ethylene. The distribution of vinyl acetate and of ethylene in the EVA copolymer are accounted for in other parameters of the polymer, i.e., the $T_m$, the $H_f$, and the high temperature tensile storage modulus.

An additional component for consistently enhancing the adhesion of EVA polymers for heat seal applications is in the incorporation of a carboxylic acid. These carboxylic acids include $C_3$–$C_{10}$ alkenoic acids, such as acrylic acid, methacrylic acid, crotonic acid, and isocrotonic acid, and alpha, beta-unsaturated $C_4$–$C_{10}$ alkenedioic acids such as maleic acid, fumaric acid, and itaconic acid. Typically, these acids are incorporated in an amount of from 0.2 to 10% by weight and preferably 0.5 to 5% by weight. It has been found that the incorporation of these acids act as adhesion promoters. Exemplary polymers for heat seal applications have a vinyl acetate content of from 15 to 80%, the ethylene content from 20 to 85%, and the level of carboxylic acid from 0 to 5% by weight of the polymer.

Other monomers which can be emulsion polymerized into the polymer include $C_1$–$C_{18}$ alkyl esters or esters with $C_1$–$C_{18}$ alkanols, such as methanol, ethanol, propanol, butanol, and 2-ethylhexanol; vinyl halides, such as vinyl chloride; mono and diesters of alpha, beta-unsaturated $C_4$–$C_{10}$ alkenedioic acids such as maleic acid, fumaric acid, and itaconic acid and $C_1$–$C_{18}$ alkanols; nitrogen containing mono-olefinically unsaturated monomers, particularly nitriles, amides, N-methylol amides, $C_1$–$C_4$ alkanoic acid ethers of N-methylol amides and allylcarbamates, such as acrylonitrile, acrylamide, methacrylamide, N-methylol acrylamide, N-methylol methacrylamide, N-methylol allylcarbamate, and $C_1$–$C_4$ alkyl ethers or $C_1$–$C_4$ alkanoic acid esters of N-methylol acrylamide, N-methylol methacrylamide and N-methylol allylcarbamate; sodium vinyl sulfonate; and 2-acrylamido-2-methyl propanesulfonate. The monomers can be incorporated in minor amounts, e.g. from 0 to about 10% by weight.

The usefulness of VAE and EVA emulsion polymers and their application are dictated by the polymer properties which are in turn affected by many factors outside the specific formulation employed, e.g., monomers employed, monomer ratio, initiator level and surfactant package, as well as the polymerization procedure. For example, because vinyl acetate and ethylene have significantly different vapor pressures when subjected to the polymerization conditions described herein and because ethylene is difficult to solubilize in the polymerization medium, one can dramatically affect the distribution of the vinyl acetate and ethylene within the polymer. Thus, two polymers having substantially equal levels of vinyl acetate and ethylene can have substantially different structures and dramatically different properties.

It has been found that in the development of EVA polymers for heat seal applications by emulsion polymerization that the concentration of vinyl acetate and ethylene in the polymer is not solely responsible for its use as a heat seal adhesive. The distribution of vinyl acetate and ethylene is a major factor. It has been found that there needs to be a sufficient level of amorphous ethylene-vinyl acetate polymer segments to provide adhesion to a substrate and a sufficient level of crystalline ethylene polymer segments to provide the proper balance of heat seal characteristics and non-blocking. Polymerized ethylene segments lead to ethylene crystallinity in the polymer. Too much of one and too little of another can lead to EVA polymers which have little adhesion in terms of hot green strength and room temperature adhesive strength, but pass the non-blocking test or they may have desired adhesion but are do not meet the non-blocking test at desired temperature and pressure.

In VAE and EVA polymers the $T_g$ of the polymer can be controlled by adjusting the ethylene content, i.e., generally the more ethylene present in the polymer relative to other co-monomers, the lower the $T_g$. However, it has been found that under certain polymerization conditions where formation of crystalline polyethylene domains are favored, the $T_g$ does not continue to systematically decrease in proportion to the increase in ethylene concentration. If the ethylene segments were short resulting in amorphous as opposed to crystalline domains, the $T_g$ would drop even further, e.g., below about −40° C. Crystalline polyethylene domains in the polymer impart a $T_m$ and $H_f$ to the polymer. It has also been found that by influencing the balance of amorphous ethylene-vinyl acetate domains and crystalline ethylene domains in the polymer, one can generate a range of aqueous copolymer dispersions containing a range of $T_g$, $T_m$ and $H_f$, and a high tensile storage modulus at high temperatures; i.e., temperatures of about 115° C. Conventional VAE emulsion polymers prepared by batch polymerization in the presence of poly(vinyl alcohol) having from 20 to 35% ethylene may exhibit high tensile storage modulus at elevated temperature because poly(vinyl alcohol) itself inherently exhibits high tensile storage modulus at elevated temperatures. But these conventional VAE emulsion polymers themselves do not exhibit a $T_m$ nor do they have a $H_f$ because these polymers do not have the ethylene crystallinity exemplified by the polymers described herein. In addition, the lack of heat sealability for the VAE emulsion polymers containing poly (vinyl alcohol) is partly driven by the high $T_g$ of poly(vinyl alcohol) and partly driven by the inherent semi-crystallinity of poly(vinyl alcohol). In these conventional VAE emulsion polymers, the ethylene units are largely incorporated in an amorphous state and there is a substantial absence of crystalline ethylene domains.

One preferred way to enhance crystalline domain formation of ethylene in the EVA polymer is to delay the addition of vinyl acetate during the polymerization process such that the unreacted vinyl acetate level present in the reactor is minimal at different stages during the process, i.e., below 5% unreacted free vinyl acetate monomer. Particularly, in the absence of carboxyl functionality, it is preferred to stage the addition of vinyl acetate in the polymerization process over an initial period of time. Typically, one completes the addition within 75% of the total polymerization period and generally within 3 hours or less. Thus, vinyl acetate/ethylene polymerization can take place in the initial stage where most, but not all, of the ethylene will reside in amorphous regions, and the formation of the majority of crystalline ethylene domains can occur in the later stage of the polymerization process.

The tensile storage modulus profile for these EVA polymers provides an insight to the distribution of vinyl acetate and ethylene in the polymer and the melt flow characteristics. The polymers suited for use as heat seal adhesives as described herein have a high tensile storage modulus and are highly viscous with minimal flow properties at temperatures where other EVA and VAE polymers melt and exhibit melt flow characteristics. The polymers described herein maintain a high viscosity and resistance to flow at temperatures well above their melt temperatures. The modulus should be at least $1\times10^5$ in dynes/cm$^2$, (preferably $2\times10^5$) at 115° C. as measured at a test frequency of 6.28 rad/sec.

Other factors leading to crystalline ethylene domains within the polymer is the pressure and temperature of polymerization. Although pressure is influential in achieving higher ethylene concentration levels in the polymer, it also is a factor in determining whether the amount of ethylene which is present is in amorphous regions or crystalline domains. Temperature, also is relevant in the formation of ethylene crystallinity. Lastly, the level of initiator is also a factor in developing EVA copolymers for heat seal applications.

In the preferred process for effecting polymerization and the formation of EVA polymers for heat seal applications, polymerization of ethylene, vinyl acetate, and carboxylic acid is initiated by thermal initiators or by redox systems. A thermal initiator is typically used at temperatures of about 60° C. or higher, preferably about 70° C. or higher. Redox systems can be used over a wide range of temperatures, but are typically used at temperatures of about 60° C. or lower. The amount of initiator used in the process typically is substantially higher than used in prior processes for forming aqueous based vinyl acetate/ethylene dispersion polymers. Typically, the level of initiator is at least 0.5% and typically greater than 0.8% by weight of the total monomer charged. In addition, it is preferred that the initiator is added over the time of polymerization. It is believed that a high radical flux created by the higher levels of initiator facilitates ethylene incorporation during this low pressure polymerization process and leads to crystalline ethylene segments and a branched polymer architecture in the resulting copolymer and thus exhibits a higher tensile storage modulus at elevated temperatures, thermal melting point, and a heat of fusion. Thermal initiators are well known in the emulsion polymer art and include, for example, ammonium persulfate, sodium persulfate, and the like. Suitable redox systems are based upon sulfoxylates, and peroxides. Sodium formaldehyde and organic peroxides such as t-butyl hydroperoxide (t-BHP) are representative.

The ethylene and, optionally, other monomers, then are introduced under pressure of less than about 2000 psig (13,891 kPa), and agitation, and the temperature increased to reaction temperature. Initiator, vinyl acetate, and emulsifier are staged or added incrementally over the reaction period, and the reaction mixture maintained at reaction temperature for a time required to produce the desired product.

The formation of EVA polymers suited for clear, heat seal applications is highly influenced by the stabilizer system. First, the stabilizing system must support formation of emulsions having a solids content of at least 40% by weight, generally 50% and higher. Second, the stabilizing systems should be one that does not interrupt ethylene domains leading to crystalline polyethylene segments within the polymer. Although poly(vinyl alcohol) has been used as a protective colloid in producing VAE and EVA polymers, it is not suited for use in preparing polymers having the properties desired here. Typically, it interferes with ethylene incorporation during the low pressure polymerization process, it interferes with the clarity of the EVA polymer, and it interferes with heat sealability at low temperatures, e.g., 99 to 109° C., thereby rendering it generally unsuitable for use in the types of heat seal applications contemplated herein.

The protective colloid employed as a component of one of the suitable stabilizing system described herein is a cellulosic colloid. An example of a cellulosic protective colloid is hydroxyethyl cellulose. The protective colloid can be used in amounts of about 0.1 to 10 wt %, preferably 0.5 to 5 wt %, based on the total monomers.

The surfactant or emulsifier can be used at a level of about 1 to 10 wt %, preferably 1.5 to 6 wt %, based on the total weight of monomers and can include any of the known and conventional surfactants and emulsifying agents, principally the nonionic, anionic, and cationic materials, heretofore employed in emulsion polymerization. Among the anionic surfactants found to provide good results are alkyl sulfates and ether sulfates, such as sodium lauryl sulfate, sodium octyl sulfate, sodium tridecyl sulfate, and sodium isodecyl sulfate, sulfonates, such as dodecylbenzene sulfonate, alpha olefin sulfonates and sulfosuccinates, and phosphate esters, such as the various linear alcohol phosphate esters, branched alcohol phosphate esters, and alkylphenolphosphate esters.

Examples of suitable nonionic surfactants include the Igepal surfactants which are members of a series of alkylphenoxy-poly(ethyleneoxy)ethanols having alkyl groups containing from about 7 to 18 carbon atoms, and having from about 4 to 100 ethyleneoxy units, such as the octylphenoxy poly(ethyleneoxy)ethanols, nonylphenoxy poly(ethyleneoxy)ethanols, and dodecylphenoxy poly(ethyleneoxy)ethanols. Others include fatty acid amides, fatty acid esters, glycerol esters, and their ethoxylates, ethylene oxide/propylene oxide block polymers, secondary alcohol ethoxylates, and tridecylalcohol ethoxylates.

Examples of common cationic surfactants are dialkyl quaternaries, benzyl quaternaries, and their ethoxylates.

Average particle size distributions for the polymer particles of the emulsion polymers of this invention range from 0.05 microns to 2 microns, preferably 0.10 microns to 1 micron.

In an example of using the emulsion polymers of this invention for heat seal applications, the emulsion polymers can be applied with a gravure coater to a printed paperboard stock, dried, stored, and shipped to an end user where the board is formed, filled, and sealed. As mentioned, non-block is essential for stacking, handling, and storage. Yet, a rapid heat seal is desired at a temperature as low as possible to maximize production and minimize the heat impact on the coated board.

It has also been found that the pH of the emulsion polymers of this invention can influence some performance in heat seal applications. Adjusting the pH of the polymer emulsions to either a less acidic, neutral, or basic state (pH of about 7 or higher) has been observed to improve hot green strength and gloss, without significantly affecting the melting point and/or the heat of fusion. Neutralization may be accomplished by the addition of a variety of alkaline solutions, such as sodium hydroxide, ammonium hydroxide, and the like.

The invention is further clarified by a consideration of the following examples, which are intended to be purely exemplary of the invention.

Ethylene levels in the polymer were determined by mass balance. The designation U represents delay, S represents staged, and B represents batch addition of monomers.

Grit

Grit measurements were obtained by filtering a weighed quantity of emulsion polymer through a 100-mesh screen. The filtrate from this screen was then filtered through a 325-mesh screen. The weight of the dried polymer collected on each screen was divided by the total emulsion polymer weight resulting in a grit value for each mesh size.

Blocking

Blocking is defined as unwanted adhesion between touching layers of an adhesive coated substrate to itself or an uncoated substrate. This can occur under moderate pressure, temperature, or high relative humidity (RH) as coated substrates are rolled or wound upon themselves or stacked upon themselves during storage or prior to use. Two factors of the polymer are relevant in blocking. First, the polymer should have a high thermal melt point. Thus, at temperature, the polymer will not convert to a substantially reduced tensile storage modulus state. Second, the heat of fusion is indicative of the amount of crystallinity. At low crystallinity levels, it is possible that short term heat excursions may destroy all of the crystallinity in the polymer depending upon the $T_g$ and $T_m$ properties of the polymer, and thus block. Higher heats of fusion and thermal melt temperatures contribute to shelf life of the coated product on storage.

Apparatus and Materials

The following materials and apparatus were used: a 2 mil (0.0051 cm) bird bar (or equivalent) to obtain a 1 mil (0.0025 cm) dry coating on kraft paper, or other suitable substrate; a 3-inch (7.6 cm)×3-inch (7.6 cm) glass plate; a 500 g weight (cylindrical shaped with a flat bottom, 4 cm in diameter) 39.788 $g/cm^2$ pressure; and a forced Draft Oven.

Procedure

Substrate was coated with sample to be tested using a 2 mil bird bar (to obtain approximately a 1 mil dry coating). Coated substrate was air dried under TAPPI conditions (73.4° F. (23° C.), 50% RH) for 24 hours. Dried coated substrate was cut into 1½ inch (3.81 cm)×1½ inch (3.81 cm) squares. Two samples of 2 squares face-to-back and 2 squares face to face were placed on the flat glass plate. A 500 g weight was placed on the glass plate so that it rested in the center of the 1½ inch×1½ inch squares. The composite was placed in the forced draft oven set at a specified temperature for a specified time. Face to back results were reported below (the blocking test is not always indicative of the polymer and the recording of a polymer that blocked may not be necessarily attributible solely to the polymer).

The samples are pulled apart carefully and rated for blocking as follows: 1) Non-blocking, 2) Crackling (no surface mars), 3) Surface Marring, 4) Few Fibers (5% or less), 5) Fiber Tear (many fibers)=100% Blocking. A rating of 1 to 3 was considered a "pass."

Heat Seal

Heat seal characteristics were determined using the following apparatus, materials and procedure: Sentinel Laboratory Heat Sealer, Model 12AS, 2 mil (0.0051 cm) bird bar or equivalent Materials; Kraft paper, or other suitable substrate.

Procedure

A substrate was coated using a 2 mil bird bar (or equivalent) and dried overnight (approximately 16 hours) at 25° C. and 50% RH. The coating should be continuous and uniform on the surface of the substrate. A second sheet of the uncoated substrate was placed on top of the coated sheet and the two were placed in the jaws of the Sentinel Laboratory Heat Sealer for 1 second at 40 psig (377 kPa). The temperature setting will depend on the emulsion used and the substrate used. In this example, 109° C. and 99° C. were used. The two sheets were allowed to cool to room temperature. They were then pulled apart and the fiber tear was recorded. (In some cases poor adhesion may result from inadequate coating or other variable and may not be necessarily attributable solely to the polymer. For example, those polymers having a $T_m$ and a high $H_f$ may not melt sufficiently in the time frame allotted to effect adhesion.)

Hot Green Strength

Hot green strength is a desirable characteristic of the heat seal bond. It is defined as the strength of the bond as judged by peel adhesion or cleavage immediately after forming the bond in the heat sealing process. Reported data corresponds to percent fiber tear while the bond is still warm. The ability to hold the bond in place until the construction cools results in a firmer, stronger ultimate bond. If the polymer exhibits poor hot green strength, it may still have good heat seal characteristics once the bond reaches room temperature.

Tensile Storage Modulus

Tensile storage modulus as a function of temperature was measured at a test frequency of 6.28 rad/sec and expressed as dynes/cm$^2$. More specifically, dynamic mechanical testing of the polymer samples for measuring tensile storage modulus was accomplished using the following procedure. ASTM-D-4065-94 and ASTM-D-5026-94 were used as guidelines for this procedure. Each polymer emulsion was cast as a film and allowed to dry a minimum of several days at ambient conditions. The dry film thickness was typically in the range of 0.3 to 0.5 mm. For samples that did not film form adequately at room temperature, the polymers were compression molded at 100 to 150° C. The specimens used for testing were die cut from the film and were about 6.3 mm wide and 30 mm long. The specimens were tested on a Rheometrics Solid Analyzer (RSA II), from Rheometric Scientific, Inc., to obtain the tensile dynamic mechanical properties. Data were obtained every 6° C. over the −100 to 200° C. range using a fiber/film fixture and a deformation frequency of 6.28 rad/sec. To help ensure linear viscoelastic conditions, the applied strains were typically 0.05% in the glassy region and up to 1% in the rubbery region. A soak time of one minute was used at each temperature to ensure isothermal conditions. For each temperature, the RSA II calculated the tensile storage modulus (E'), tensile loss modulus (E"), and tangent delta (tan δ) based on the width, thickness and length of the sample.

Measurement of $T_g$, $T_m$, and $H_f$ $T_g$, $T_m$, and $H_f$ were determined via differential scanning calorimetry (DSC) using a TA Instruments Thermal Analyst 3100 with DSC 2010 module. Polymer samples were thoroughly dried prior to testing. Samples were held at 100° C. in the calorimeter for 5 minutes, cooled to −75° C., and then the scan acquired at a heating rate of 20° C. per minute up to a final temperature of 200° C. The $T_g$ corresponds to the extrapolated onset values obtained from the baseline shift at the glass transition during the heating scan. The melting point temperature corresponds to the peak in the heat flow curve. The heat of fusion was calculated by integrating the area under the melting endotherm; the baseline for this integration was constructed by extrapolating the linear region of the heat flow curve after the melt, back to the point of intersection with the heat flow curve before the melt.

EXAMPLE 1

Hec/Anionic Surfactant Delay Addition of Vinyl Acetate

A one-gallon stainless steel pressure reactor was charged with the following mixture:

| Material | Mass charged, g |
|---|---|
| DI Water | 1000 |
| Rodapon UB sodium lauryl sulfate | 55 |
| Natrosol 250GR HEC | 500 |
| Vinyl Acetate | 11 |

Rhodapon UB sodium lauryl sulfate (30% aqueous solution); supplied by Rhodia Natrosol 250GR (2% aqueous solution) HEC (hydroxyethyl cellulose,) supplied by Rhodia.

The following delay mixtures were utilized:

| Material | Mass charged, g |
|---|---|
| Aqueous 10.0% ammonium persulfate containing 3.5% sodium bicarbonate | 115 |
| Aqueous 10.0% sodium lauryl sulfate | 310 |
| Vinyl Acetate | 163 |
| Ethylene | 1800 psig for 5 hours |

Agitation at 100 rpm was begun with a nitrogen purge. Agitation was then increased to 800 rpm and the reactor heated to 80° C. After pressurizing the reactor with ethylene to 1800 psig (12,512 kPa), 5 g of initiator solution was added at a rate of 5.0 g/min. At initiation, the vinyl acetate delay was begun at 0.54 g/min, the surfactant delay was begun at 1.03 g/min, and the initiator delay was re-started at 0.34 g/min. Ethylene pressure of 1800 psig was maintained for 300 minutes. The vinyl acetate delay, surfactant delay, and ethylene pressure were stopped at the 300 minute mark. By delay addition, the unreacted vinyl acetate monomer in the polymerization medium was maintained at a level less than 5%

The initiator was completed at the 320 minute mark followed by holding the reaction mixture at temperature for another 30 minutes. The reaction was then cooled to 30° C., transferred to a degasser, and 2 g of Rhodaline 675 defoamer was added. The following properties of the resulting emulsion polymer (Example 1) were measured:

| Polymer Composition (by solids calculation) | 85% Ethylene<br>15% Vinyl acetate |
|---|---|
| $T_g$ Onset (° C.) | −36.3 |
| Viscosity (60/12 rpm) (cps) | 28/28 |
| 100/325 mesh grit (ppm) | <160/<170 |
| % solids | 39.3 |
| pH | 6.70 |
| $T_m$ (° C.)/$H_f$ (J/g) | 86.7/55.3 |

Using the above procedure, additional experiments were run in which the total amount of vinyl acetate monomer was varied and varying amounts of acrylic acid were investigated. Data from the samples are summarized in the table below:

| Example | Polymer Composition (%) | $T_g$ Onset (° C.) | $T_m$ (° C.)/ Heat of Fusion (J/g) |
|---|---|---|---|
| 2a | 67 Ethylene<br>33 Vinyl acetate | −39.6 | 66.2/44.3 |
| 3a | 91 Ethylene<br>9 Vinyl acetate | −41.8 | 89.8/65.1 |
| 4a | 76 Ethylene<br>24 Vinyl acetate | −38.2 | 76.0/45.2 |
| 5a | 96.6 Ethylene<br>1.7 Vinyl acetate<br>1.7 Acrylic Acid | −37.4 | 96.6/82 |
| 6a | 64.1 Ethylene<br>34.7 Vinyl acetate<br>1.2 Acrylic Acid | −37.8 | 58.1/38.3 |
| 7a | 74.7 Ethylene<br>24.6 Vinyl acetate<br>0.6 Acrylic Acid | −37.0 | 77.12/44.3 |
| 8a | 65 Ethylene<br>34.4 Vinyl acetate<br>0.6 Acrylic Acid | −36.2 | 67.3/32.1 |

EXAMPLE 2

Anionic Surfactant and Poly(Vinyl Alcohol) Stabilized VAE Delay Addition of Vinyl Acetate and Thermal Initiation Anionic surfactant and poly(vinyl alcohol) stabilized VAE polymer emulsions containing crystalline ethylene segments were prepared by first charging a one-gallon stainless steel pressure reactor with the following mixture:

| Material | Mass charged, g |
|---|---|
| DI Water | 1000 |
| Rodapon UB sodium lauryl sulfate | 42 |
| Celvol 205 poly(vinyl alcohol) (10% water solution) | 200 |
| Vinyl Acetate | 21 |

Celvol 205: 86–88% hydrolyzed poly(vinyl alcohol) supplied by Celanese

The following delay mixtures were utilized:

| Material | Mass charged, g |
|---|---|
| Aqueous 10.0% ammonium persulfate containing 3.5% sodium bicarbonate | 115 |
| Aqueous 10.0% sodium lauryl sulfate | 218 |
| Vinyl Acetate | 325 |
| Ethylene | 1800 psig for 5 hours |

Agitation at 100 rpm was begun with a nitrogen purge. Agitation was then increased to 800 rpm and the reactor heated to 80° C. After pressurizing the reactor with ethylene to 1800 psig (12,512 kPa), 5 g of initiator was added at a rate of 5.0 g/min. At initiation, the vinyl acetate delay was begun at 1.08 g/min, the surfactant delay was begun at 0.71 g/min, and the initiator delay was re-started at 0.34 g/min. Ethylene pressure of 1800 psig (12,512 kPa) was maintained for 300 minutes. The vinyl acetate delay, surfactant delay, initiator delay, and ethylene pressure were completed at the 300 minute mark. Then the reaction mixture was held at temperature for another 30 minutes. Next, the reaction was cooled to 30° C. and transferred to a degasser and 2 g of Rhodaline 675 defoamer was added. The following properties of the resulting emulsion polymer were measured:

| Polymer Composition (by solids calculation) | 70% Ethylene 30% Vinyl acetate |
|---|---|
| $T_g$ Onset (° C.) | −40.15 |
| Viscosity (60/12 rpm) (cps) | 4700/5500 |
| 100/325 mesh grit (ppm) | <100/<2950 |
| % solids | 45.9 |
| pH | 4.90 |
| $T_m$ (° C.)/$H_f$ (J/g) | 69.2/42 |

EXAMPLE 3

Mixed Hec/Surfactant Stabilized VAE Delay Addition of Vinyl Acetate Low Temperature, Redox Initiator A one-gallon stainless steel pressure reactor was charged with the following mixture:

| Material | Mass charged, g |
|---|---|
| DI Water | 650 |
| Ferrous Ammonium Sulfate (2% aqueous solution) | 6.0 |
| Triton X-200 (28% solution in water) surfactant | 30 |
| Triton X-305 (70% solution in water) surfactant | 42 |
| Igepal CO-630 surfactant | 12 |
| Natrosol 250GR (2% solution in water) HEC | 350 |
| Vinyl Acetate | 100 |

Triton; anionic surfactants supplied by Union Carbide
Igepal CO-630; nonyl phenol ethoxylate surfactant supplied Rhone-Polenc.

The following delay mixtures were utilized:

| Material | Mass charged, g |
|---|---|
| Aqueous 4.0% t-BHP | 235 |
| Aqueous 8.0% SFS | 243 |
| Vinyl Acetate | 400 |
| Ethylene | 1800 psig for 5 hours |

SFS = sodium formaldehyde sulfoxylate

Agitation at 100 rpm was begun with a nitrogen purge. Agitation was then increased to 700 rpm and the reactor heated to 60° C. After pressurizing the reactor with ethylene to 1800 psig (12,512 kPa), 10 g of SFS solution was added. Then the redox delays were started; t-BHP at 0.60 g/min and SFS at 0.60 g/min. At initiation, the vinyl acetate delay was begun at 1.21 g/min. Ethylene pressure of 1800 psig (12,512 kPa) was maintained for 360 minutes. The vinyl acetate delay was completed at the 330 minute mark. The redox delays and ethylene makeup pressure was completed at the 360 minute mark. Then the reaction mixture was held at temperature for another 30 minutes. Next, the reaction was cooled to 30° C. and transferred to a degasser and 2 g of Rhodaline 675 defoamer was added. The following properties of the resulting emulsion polymer were measured:

| Polymer Composition (by solids calculation) | 50% Ethylene 50% VAM |
|---|---|
| $T_g$ Onset (° C.) | −38.4 |
| Viscosity (60/12 rpm) (cps) | 66/107 |
| 100/325 mesh grit (ppm) | <8120/<630 |
| % solids | 42.8 |
| pH | 4.56 |
| $T_m$ (° C.)/$H_f$ (J/g) | ~40*/35.4 |

*$T_m$ transition is broad, ranging from about 16 to 50° C., as determined by DSC.

EXAMPLE 4

Mixed Hec/Surfactant Stabilized VAE Delay Addition of Vinyl Acetate High Temperature, Thermal Initiator A one-gallon stainless steel pressure reactor was charged with the following mixture:

| Material | Mass charged, g |
|---|---|
| DI Water | 1500 |
| Rhodapon UB sodium lauryl sulfate | 25 |

-continued

| Material | Mass charged, g |
| --- | --- |
| Igepal CO-630 surfactant | 15 |
| Natrosol 250GR HEC | 350 |
| Vinyl Acetate | 21 |

The following delay mixtures were utilized:

| Material | Mass charged, g |
| --- | --- |
| 5% Aqueous ammonium persulfate/1.7% sodium bicarbonate | 238 |
| Aqueous Surfactant Delay: 10.5% sodium lauryl sulfate 3.5% sodium vinyl sulfonate | 71 (total) |
| Vinyl Acetate | 322 |
| Ethylene | 1800 psig for 5 hours |

Agitation at 100 rpm was begun with a nitrogen purge. Agitation was then increased to 500 rpm and the reactor heated to 85° C. After pressurizing the reactor with ethylene to 1800 psig (12,512 kPa), 18 g of initiator solution was added at a rate of 2.0 g/min. Then the vinyl acetate delay was begun at 1.07 g/min, the surfactant delay was begun at 0.24 g/min, and the initiator delay was reduced to 0.70 g/min. Ethylene pressure of 1800 psig (12,512 kPa) was maintained for 300 minutes. The vinyl acetate delay and surfactant delay were completed at the 300 minute mark. The initiator delay was completed at the 315 minute mark. Then the reaction mixture was held at temperature for another 45 minutes. Next, the reaction was cooled to 30° C. and transferred to a degasser and 2 g of Rhodaline 675 defoamer was added. The following properties of the resulting emulsion polymer were measured:

| | |
| --- | --- |
| Polymer Composition (by solids calculation) | 65% Ethylene 35% Vinyl acetate |
| $T_g$ Onset (° C.) | −45 |
| Viscosity (60 rpm) (cps) | 26 |
| 100/325 mesh grit (ppm) | <75/<4650 |
| % solids | 34.7 |
| pH | 4.80 |
| $T_m$ (° C.)/$H_f$ (J/g) | 66.2/41.6 |

EXAMPLE 5

Anionic Surfactant Stabilized VAE High Temperature, Thermal Initiators Staged Addition of Vinyl Acetate A one-gallon stainless steel pressure reactor was charged with the following mixture:

| Material | Mass charged, g |
| --- | --- |
| DI Water | 900 |
| Rodapon UB sodium lauryl sulfate | 60 |
| Natrosol 250GR HEC | 500 |
| Vinyl Acetate | 100 |

The following delay mixtures were utilized:

| Material | Mass charged, g |
| --- | --- |
| Aqueous 10.0% ammonium persulfate containing 3.5% sodium bicarbonate | 111 |
| Aqueous 10.0% sodium lauryl sulfate | 360 |
| Vinyl Acetate | 250 |
| Ethylene | 1400 psig for 5 hours |

Agitation at 100 rpm was begun with a nitrogen purge. Agitation was then increased to 800 rpm and the reactor heated to 80° C. After pressurizing the reactor with ethylene to 1400 psig (9,754 kPa), 5 g of initiator was added at a rate of 5.0 g/min, after which the rate was reduced and maintained at 0.30 g/min. Ten minutes after starting the initiator delay, the vinyl acetate delay was begun at 2.78 g/min and the surfactant delay was begun at 1.20 g/min. Ethylene pressure of 1400 psig was maintained for 300 minutes. The vinyl acetate delay was staged, i.e., completed at the 90 minute mark. In a staged addition, generally all of the vinyl acetate is added within the first 1.5 to 3 hours of the polymerization. This is in contrast to the previous examples, e.g., Example 4, where the vinyl acetate was added (delayed) over the generally 300+ minute reaction time. It is believed that this process will favor the formation of a VAE type copolymer early in the polymerization and favor the formation of an EVA type polymer having crystalline ethylene domains in the later stage of the polymerization.

The surfactant delay, initiator delay, and ethylene pressure were completed at the 300 minute mark. The reaction mixture was then held at temperature for another 30 minutes. Next, the reaction was cooled to 30° C. and transferred to a degasser and 2 g of Rhodaline 675 defoamer was added. The following properties of the resulting emulsion polymer were measured:

| | |
| --- | --- |
| Polymer Composition (by solids calculation) | 74% Ethylene 26% Vinyl acetate |
| $T_g$ Onset (° C.) | −33.4 |
| Viscosity (60/12 rpm) (cps) | 660/1440 |
| 100/325 mesh grit (ppm) | <20/<70 |
| % solids | 41.2 |
| pH | 5.43 |
| $T_m$ (° C.)/$H_f$ (J/g) | 95.0/52.5 |

EXAMPLE 6

Preparation of Ethylene-Vinyl Acetate-Acrylic Acid Polymer Delay Addition, Polymer Seed, Redox Initiation At 60° C.

A one-gallon stainless steel pressure reactor was charged with the following mixture:

| Material | Mass charged, g |
| --- | --- |
| DI Water | 700 |
| Rodapon UB sodium lauryl sulfate | 50 |
| Natrosol 250GR HEC | 500 |
| Ferrous ammonium sulfate (2% solution in water) | 6 |
| Vinyl Acetate | 200 |

The following delay mixtures were utilized:

| Material | Mass charged, g |
|---|---|
| Aqueous 4.0% t-BHP | 108 |
| Aqueous 8% sodium formaldehyde sulfoxylate | 116 |
| Aqueous 15.0% sodium lauryl sulfate | 195 |
| 87.5% vinyl acetate and 12.5% acrylic acid solution | 250 |
| Ethylene | 1600 psig for 5 hours |

Agitation at 100 rpm was begun with a nitrogen purge. Agitation was then increased to 800 rpm and the reactor heated to 60° C. 10 g of sodium formaldehyde sulfoxylate solution was then added. Delay feeds of tert-butylhydrogen peroxide at 0.3 g/min. and sodium formaldehyde sulfoxylate at 0.3 g/min were begun. After most of the initial charge of vinyl acetate was consumed, the reactor was pressurized with ethylene to 1600 psig (11,133 kPa). Then the monomer delay was begun at 0.83 g/min and the surfactant delay was begun at 0.65 g/min. Ethylene pressure of 1600 psig was maintained for 300 minutes. The monomer delay, surfactant delay, and ethylene pressure were completed at the 300 minute mark. The redox initiator delay feeds were completed at the 310 minute mark. Next, the reaction was cooled to 30° C. and transferred to a degasser, and 2 g of Rhodaline 675 defoamer was added. The following properties of the resulting emulsion polymer were measured:

| | |
|---|---|
| Polymer Composition (by solids calculation) | 50% Ethylene |
| | 46.5% Vinyl acetate |
| | 3.5% Acrylic Acid |
| $T_g$ Onset (° C.) | −29.3 |
| Viscosity (60/12 rpm) (cps) | 270/400 |
| 106/325 mesh grit (ppm) | <90/<270 |
| % solids | 37 |
| pH | 4.6 |
| $T_m$ (° C.)/$H_f$ (J/g) | 69.6/31.3 |

EXAMPLE 7

Preparation of Vinyl Acetate-Ethylene-Veova-10 Ester-Acrylic Acid Polymer Emulsion Low Temperature, Polymer Seed, Redox Initiation A one-gallon stainless steel pressure reactor was charged with the following mixture:

| Material | Mass charged, g |
|---|---|
| DI Water | 700 |
| Rodapon UB sodium lauryl sulfate | 50 |
| Natrosol 250GR HEC | 500 |
| Ferrous ammonium sulfate (2% solution in water) | 6 |
| Vinyl Acetate | 60 |
| VEOVA-10 ester | 60 |

VEOVA-10 ester: ethenyl ester of versatic acid supplied by Shell

The following delay mixtures were utilized:

| Material | Mass charged, g |
|---|---|
| Aqueous 4.0% t-BHP | 124 |
| Aqueous 8% sodium formaldehyde sulfoxylate | 136 |
| Aqueous 15.0% Sodium lauryl sulfate | 240 |
| 87.5% Vinyl acetate and 12.5% acrylic acid solution | 250 |
| Ethylene | 1500 psig for 6 hours |

Agitation at 100 rpm was begun with a nitrogen purge. Agitation was then increased to 500 rpm and the reactor heated to 60° C. 10 g of sodium formaldehyde sulfoxylate solution was then added. Delay feeds of tert-butylhydrogen peroxide at 0.3 g/min. and sodium formaldehyde sulfoxylate at 0.3 g/min were begun. After most of the initial charge of vinyl acetate and VEOVA-10 was consumed, the reactor was pressurized with ethylene to 1500 psig (10,444 kPa) and agitation increased to 800 rpm. Then the monomer delay was begun at 0.69 g/min and the surfactant delay was begun at 0.67 g/min. Ethylene pressure of 1500 psig (10,444 kPa) was maintained for 360 minutes. The monomer delay, surfactant delay, and ethylene pressure were completed at the 360 minute mark. The redox initiator delay feeds were completed at the 380 minute mark. Next, the reaction was cooled to 30° C. and transferred to a degasser and 2 g of Rhodaline 675 defoamer was added. The following properties of the resulting emulsion polymer were measured:

| | |
|---|---|
| Polymer Composition (by solids calculation) | 63.5% Ethylene |
| | 27.5% Vinyl acetate |
| | 6.0% VEOVA-10 ester |
| | 3.0% Acrylic Acid |
| $T_g$ Onset (° C.) | −31.6 |
| Viscosity (60/12 rpm) (cps) | 335/440 |
| 100/325 mesh grit (ppm) | <120/<160 |
| % solids | 39.4 |
| pH | 4.5 |
| $T_m$ (° C.)/$H_f$ (J/g) | 76.7/52.6 |

EXAMPLE 8

Anionic Surfactant Stabilized Ethylene-Vinyl Acetate-Acrylic Acid Polymer High Temperature, Thermal Initiator with Delay Addition A one-gallon stainless steel pressure reactor was charged with the following mixture:

| Material | Mass charged, g |
|---|---|
| DI Water | 800 |
| Rodapon UB sodium lauryl sulfate | 55 |
| Natrosol 250GR HEC | 500 |
| Vinyl Acetate | 20 |

The following delay mixtures were utilized:

| Material | Mass charged, g |
| --- | --- |
| Aqueous 10.0% ammonium persulfate containing 3.5% sodium bicarbonate | 96 |
| Aqueous 15.0% sodium lauryl sulfate | 248 |
| 89% Vinyl acetate and 11% acrylic acid monomer solution | 450 |
| Ethylene | 1800 psig for 7 hours |

Agitation at 100 rpm was begun with a nitrogen purge. Agitation was then increased to 800 rpm and the reactor heated to 80° C. After pressurizing the reactor with ethylene to 1800 psig (12,512 kPa), 5 g of initiator was added at a rate of 5.0/min. After 5 g of initiator was added, the initiator delay feed rate was reduced to 0.24 g/min. After a 10 minute period, the monomer solution delay was begun at 1.07 g/min and the surfactant delay was begun at 0.59 g/min. Ethylene pressure of 1800 psig was maintained for 420 minutes. The vinyl acetate delay, surfactant delay, and ethylene pressure were turned off at the 420 minute mark. The initiator was completed at the 430 minute mark followed by holding the reaction mixture at temperature for another 30 minutes. The reaction was then cooled to 30° C., transferred to a degasser, and 2 g of Rhodaline 675 colloid was added. The following properties of the resulting emulsion polymer were measured:

| | |
| --- | --- |
| Polymer Composition (by solids calculation) | 61% Ethylene<br>35% Vinyl acetate<br>4% Acrylic Acid |
| $T_g$ Onset (° C.) | −33.7 |
| Viscosity (60/12 rpm) (cps) | 2580/5650 |
| 100/325 mesh grit (ppm) | <290/<260 |
| % solids | 44 |
| pH | 4.6 |
| $T_m$ (° C.)/$H_f$ (J/g) | 57.4/13.8 |

EXAMPLE 9

Anionic Surfactant Stabilized Polyethylene Emulsion High Temperature Initiation with Delay Addition A one-gallon stainless steel pressure reactor was charged with the following mixture:

| Material | Mass charged, g |
| --- | --- |
| DI Water | 1000 |
| Rhodapon UB sodium lauryl sulfate | 40 |

The following delay mixtures were utilized:

| Material | Mass charged, g |
| --- | --- |
| Aqueous 10.0% Ammonium persulfate containing 3.5% sodium bicarbonate | 80 |
| Aqueous 10.0% Sodium lauryl sulfate | 161 |
| Ethylene | 1800 psig for 3 hours |

Agitation at 100 rpm was begun with a nitrogen purge. Agitation was then increased to 800 rpm and the reactor heated to 80° C. After pressurizing the reactor with ethylene to 1800 psig (12,512 kPa), 20 g of initiator was added at a rate of 5.0 g/min. After 20 g of initiator was added, the initiator delay feed rate was reduced to 0.34 g/min and the surfactant delay was begun at 0.91 g/min. Ethylene pressure of 1800 psig was maintained for 180 minutes. The surfactant delay, initiator delay, and ethylene pressure were turned off at the 180 minute mark. The reaction was then cooled to 30° C., transferred to a degasser, and 2 g of Rhodaline 675 defoamer was added. The following properties of the resulting emulsion polymer were measured:

| | |
| --- | --- |
| Polymer Composition (by solids calculation) | 100% Ethylene |
| $T_g$ Onset (° C.) | None detected |
| Viscosity (60/12 rpm) (cps) | 65/220 |
| 100/325 mesh grit (ppm) | <2800/<9360 |
| % solids | 22 |
| pH | 8.7 |
| $T_m$ (° C.)/$H_f$ (J/g) | 98.4/98.7 |

EXAMPLE 10

Anionic Surfactant Stabilized VAE High Temperature, Thermal Initiation and Staged Addition, No Acrylic Acid This example is in contrast to Example 5 showing the effect of staged addition of vinyl acetate favoring the formation of a VAE type polymer in the first phase and an EVA type polymer in the later phase of the polymerization as compared to maintaining a generally constant level of unreacted vinyl acetate during the entire the polymerization period. In terms of structure, it can be considered a modified core/shell polymer.

An anionic surfactant stabilized VAE polymer emulsion containing crystalline ethylene segments was prepared by first charging a one-gallon stainless steel pressure reactor with the following mixture:

| Material | Mass charged, g |
| --- | --- |
| DI Water | 1000 |
| Rhodapon UB sodium lauryl sulfate | 60 |
| Natrosol 250GR HEC | 500 |
| Vinyl Acetate | 150 |

The following delay mixtures were utilized:

| Material | Mass charged, g |
| --- | --- |
| Aqueous 10.0% Ammonium persulfate containing 3.5% sodium bicarbonate | 63 |
| Aqueous 10.0% Sodium lauryl sulfate | 221 |
| Ethylene | 1800 psig for 3 hours |

Agitation at 100 rpm was begun with a nitrogen purge. Agitation was then increased to 800 rpm and the reactor heated to 80° C. After pressurizing the reactor with ethylene to 1800 psig (12,512 kPa), 5 g of initiator was added at a rate of 5.0 g/min. After 5 g of initiator had been added, the initiator delay feed rate was reduced to 0.30 g/min. After a 10 minute period, the surfactant delay was begun at 1.22 g/min. Ethylene pressure of 1800 psig was maintained for 180 minutes. The surfactant delay, initiator delay, and ethylene pressure were turned off at the 180 minute mark, followed by holding the reaction mixture at temperature for another 30 minutes. The reaction was then cooled to 30° C., transferred to a degasser, and 2 g of Rhodaline 675 defoamer was added. The following properties of the resulting emulsion polymer were measured:

| Polymer Composition | 83% Ethylene |
|---|---|
| (By solids calculation) | 17% Vinyl acetate |
| $T_g$ Onset (° C.) | −35.6 |
| Viscosity (60/12 rpm) (cps) | 30/35 |
| 100/325 mesh grit (ppm) | <155/<1800 |
| % solids | 34.5 |
| pH | 5.6 |
| $T_m$ (° C.)/$H_f$ (J/g) | 96.7/72.5 |

EXAMPLE 11

Mixed Surfactant System for Preparation of Ethylene-Vinyl Acetate-Acrylic Acid Polymer 1400 Psig Pressure, Staged Addition High Temperature, Thermal Initiation A one-gallon stainless steel pressure reactor was charged with the following mixture:

| Material | Mass charged, g |
|---|---|
| DI Water | 1100 |
| Aerosol MA80I surfactant | 10 |
| Monomer Solution comprising 95 wt % vinyl acetate and 5 wt % acrylic acid | 120 |

Aerosol MA80I anionic surfactant supplied by Cytec; dihexylester of sodium sulfosuccinic acid.

The following delay mixtures were utilized:

| Material | Mass charged, g |
|---|---|
| Aqueous 10.0% Ammonium persulfate containing 3.5% sodium bicarbonate | 131 |
| Aqueous solution comprising 15 wt % Rhodacal DS-10 surfactant and 85 wt % water | 260 |
| Monomer Solution comprising 95 wt % vinyl acetate and 5 wt % acrylic acid | 540 |
| Ethylene | 1400 psig for 5.5 hours |

Rhodacal DS-10 anionic surfactant supplied by Rhodia; sodium dodecylbenzene sulfonate.

Agitation at 100 rpm was begun with a nitrogen purge. Agitation was then increased to 900 rpm and the reactor heated to 80° C. After pressurizing the reactor with ethylene to 1400 psig (9,754 kPa), 15 g of initiator was added at a rate of 5.0 g/min. After 15 g of initiator had been added, the initiator delay feed rate was reduced to 0.30 g/min. After a 10 minute period, the surfactant delay was begun at 0.72 g/min and the monomer solution delay was begun at 3.0 g/min. Ethylene pressure of 1400 psig was maintained for 5.5 hours. The monomer solution delay was turned off at the 3 hour mark. The ethylene makeup valve was closed at the 5.5 hour mark. The surfactant delay and initiator delay were stopped at the 6 hour mark, followed by holding the reaction mixture at temperature for another 30 minutes. The reaction was then cooled to 30° C., transferred to a degasser, and 2 g of Rhodaline 675 defoamer was added. The following properties of the resulting emulsion polymer were measured:

| Polymer Composition | 51% Ethylene |
|---|---|
| (By solids calculation) | 46.5% Vinyl acetate |
|  | 2.5% Acrylic Acid |
| $T_g$ Onset (° C.) | −29.9 |
| Viscosity (60/12 rpm) (cps) | 400/1260 |
| 100/325 mesh grit (ppm) | <20/<25 |
| % solids | 49.1 |
| pH | 4.5 |
| $T_m$ (° C.)/$H_f$ (J/g) | 86.7/23.6 |

EXAMPLE 12

Mixed Surfactant System in Preparation of Ethylene-Vinyl Acetate-Acrylic Acid Polymer 1400 Psig Pressure, Staged Addition Low temperature, Redox Initiation This example is in contrast to Example 11 and provides a comparison of low temperature, redox initiation to thermal initiation. A one-gallon stainless steel pressure reactor was charged with the following mixture:

| Material | Mass charged, g |
|---|---|
| DI Water | 700 |
| Rhodacal DS-10 | 9 |
| Natrosol 250GR HEC | 500 |
| Ferrous ammonium sulfate (2% solution in water) | 6 |
| Monomer solution containing 95 wt % vinyl acetate and 5 wt % acrylic acid | 120 |

The following delay mixtures were utilized:

| Material | Mass charged, g |
|---|---|
| Aqueous 4.0% t-BHP | 133 |
| Aqueous 8% sodium formaldehyde sulfoxylate | 132 |
| Aqueous solution containing 52.5 g Rhodacal DS-10 and 297.5 g water | 306 |
| Monomer solution containing 95 wt % vinyl acetate and 5 wt % acrylic acid | 540 |
| Ethylene | 1400 psig for 5.5 hours |

Agitation at 100 rpm was begun with a nitrogen purge. Agitation was then increased to 900 rpm and the reactor heated to 60° C. The reactor was then pressurized with ethylene to 1400 psig (9,754 kPa). 10 g of sodium formaldehyde sulfoxylate solution was then added. Delay feeds of tert-butylhydrogen peroxide at 0.3 g/min. and sodium formaldehyde sulfoxylate at 0.3 g/min were begun. After a 10 minute period, the monomer solution delay was begun at 3.0 g/min and the surfactant delay was begun at 0.85 g/min. Ethylene pressure of 1400 psig was maintained for 5.5 hours. The monomer solution delay was stopped at the 3 hour mark. The ethylene makeup valve was closed at the 5.5 hour mark. The surfactant delay and redox delays were stopped at the 6 hour mark. Next, the reaction was cooled to 30° C. and transferred to a degasser, and 2 g of Rhodaline 675 defoamer was added. The following properties of the resulting emulsion polymer were measured:

| | |
|---|---|
| Polymer Composition (by solids calculation) | 41% Ethylene |
| | 56% Vinyl acetate |
| | 3% Acrylic Acid |
| $T_g$ Onset (° C.) | −27.4 |
| Viscosity (60/12 rpm) (cps) | 700/1500 |
| 100/325 mesh grit (ppm) | <125/<310 |
| % solids | 41 |
| pH | 4.2 |
| $T_m$ (° C.)/$H_f$ (J/g) | 91.2/25.7 |

EXAMPLE 13

Anionic Surfactant in Preparation of Ethylene-Vinyl Acetate-Acrylic Acid Polymer Emulsion 1400 Psig Pressure, Staged Addition High Temperature, Thermal Initiation This example is similar to Example 11 except a lower level of acrylic acid is used. A three-gallon stainless steel pressure reactor was charged with the following mixture:

| Material | Mass charged, g |
|---|---|
| DI Water | 3000 |
| Rhodapon UB sodium lauryl sulfate | 180 |
| Natrosol 250GR HEC | 1500 |
| Monomer Solution comprising 98.75 wt % vinyl acetate and 1.25 wt % acrylic acid | 300 |

The following delay mixtures were utilized:

| Material | Mass charged, g |
|---|---|
| Aqueous 10.0% Ammonium persulfate containing 3% sodium bicarbonate | 363 |
| Aqueous 10.0% Sodium lauryl sulfate | 990 |
| Monomer Solution comprising 98.75 wt % vinyl acetate and 1.25 wt % acrylic acid | 746 |
| Ethylene | 1400 psig for 5 hours |

Agitation at 100 rpm was begun with a nitrogen purge. Agitation was then increased to 600 rpm and the reactor heated to 80° C. After pressurizing the reactor with ethylene to 1400 psig (9,754 kPa), 15 g of initiator was added at a rate of 5.0 g/min. After 5 g of initiator had been added, the initiator delay feed rate was reduced to 0.90 g/min. After a 10 minute period, the surfactant delay was begun at 3.30 g/min and the monomer delay was begun at 8.33 g/min. Ethylene pressure of 1400 psig was maintained for 300 minutes. The monomer delay was stopped at the 90 minute mark. The initiator delay rate was increased to 1.30 g/min at the 2 hour mark. The surfactant delay, initiator delay, and ethylene control valve were turned off at the 5 hour mark., followed by holding the reaction mixture at temperature for another 30 minutes. The reaction was then cooled to 35° C., transferred to a degasser, and 2 g of Rhodaline 675 defoamer was added. The following properties of the resulting emulsion polymer were measured:

| | |
|---|---|
| Polymer Composition (By solids calculation) | 74% Ethylene |
| | 25.7% Vinyl acetate |
| | 0.3% Acrylic Acid |
| $T_g$ onset (° C.) | −33.4 |
| Viscosity (60/12 rpm) (cps) | 200/300 |
| 100/325 mesh grit (ppm) | <115/<450 |
| % solids | 41.4 |
| pH | 6.0 |
| $T_m$ (° C.)/$H_f$ (J/g) | 95.1/51.6 |

EXAMPLE 14

Ethylene-Vinyl Acetate-Acrylic Acid Polymer 1400 Psig Pressure, Staged Addition, Low Temperature Resox Initiation, Chain Transfer Agent This example demonstrates the effect of chain transfer agent to influence the polymer structure and heat seal performance for a redox initiated process. A one-gallon stainless steel pressure reactor was charged with the following mixture:

| Material | Mass charged, g |
|---|---|
| DI Water | 700 |
| Rhodacal DS-10 | 9 |
| Natrosol 250GR (2% aqueous solution) | 500 |
| Ferrous ammonium sulfate (2% aqueous solution) | 6 |
| Monomer Solution comprising 94.71 wt % vinyl acetate, 4.71 wt % acrylic acid, and 0.571 wt % dodecylmercaptan | 120 |

The following delay mixtures were utilized:

| Material | Mass charged, g |
|---|---|
| Aqueous 4.0% t-BHP | 130 |
| Aqueous 8% sodium formaldehyde sulfoxylate | 139 |
| Aqueous solution containing 52.5 g Rhodacal DS-10 and 297.5 g water | 306 |
| Monomer Solution comprising 94.71 wt % vinyl acetate, 4.71 wt % acrylic acid, and 0.571 wt % dodecylmercaptan | 540 |
| Ethylene | 1400 psig for 5.5 hours |

Agitation at 100 rpm was begun with a nitrogen purge. Agitation was then increased to 900 rpm and the reactor heated to 60° C. After pressurizing the reactor with ethylene to 1400 psig (9,754 kPa), 10 g of 8% aqueous sodium formaldehyde sulfoxylate was added to the reactor. Delay feeds of tert-butylhydrogen peroxide (4%) at 0.4 g/min. and 8% sodium formaldehyde sulfoxylate at 0.4 g/min were begun. After a 10 minute period, the surfactant delay was begun at 0.85 g/min and the monomer solution delay was begun at 3.0 g/min. Redox rates were adjusted during the reaction period to maintain reasonable reaction rates. Ethylene pressure of 1400 psig was maintained for 5.5 hours. The monomer solution delay was turned off at the 3 hour mark. The ethylene makeup valve was closed at the 5.5 hour mark. The surfactant delay and initiator delay were stopped at the 6 hour mark. The reaction was then cooled to 35° C., transferred to a degasser to remove unreacted ethylene, and 2 g of Rhodaline 675 defoamer was added.

The following properties of the resulting emulsion polymer were measured:

| | |
|---|---|
| Polymer Composition (By solids calculation) | 42.5% Ethylene 55% Vinyl acetate 2.5% Acrylic Acid |
| $T_g$ Onset (° C.) | −27.1 |
| Viscosity (60/12 rpm) (cps) | 348/710 |
| 100/325 mesh grit (ppm) | <95/<40 |
| % solids | 41.9 |
| pH | 4.0 |
| $T_m$ (° C.)/$H_f$ (J/g) | 89.9/15.8 |

EXAMPLE 15

Ethylene-Vinyl Acetate-Acrylic Acid Polymer 1400 Psig Pressure, Staged Addition, High Temperature Thermal Initiator, Surfactant Stabilized A one-gallon stainless steel pressure reactor was first charged with the following mixture:

| Material | Mass charged, g |
|---|---|
| DI Water | 1100 |
| Aerosol MA-80I | 10 |
| Monomer Solution comprising 95 wt % vinyl acetate, and 5 wt % acrylic acid | 120 |

The following delay mixtures were utilized:

| Material | Mass charged, g |
|---|---|
| Aqueous 10.0% Ammonium persulfate containing 3.5% sodium bicarbonate | 127 |
| Aqueous solution containing 175 g Rhodacal UB and 175 g water | 260 |
| Monomer Solution comprising 95 wt % vinyl acetate and 5 wt % acrylic acid | 540 |
| Ethylene | 1400 psig for 5.5 hours |

Agitation at 100 rpm was begun with a nitrogen purge. Agitation was then increased to 900 rpm and the reactor heated to 80° C. After pressurizing the reactor with ethylene to 1400 psig (9,754 kPa), 15 g of initiator was added to the reactor at a rate of 5.0 g/min and once these 15 g were in, the initiator rate was reduced to 0.30 g/min. After a 15 minute period, the surfactant delay was begun at 0.72 g/min and the monomer solution delay was begun at 3.0 g/min. Ethylene pressure of 1400 psig was maintained for 5.5 hours. The monomer solution delay was turned off at the 3 hour mark. The ethylene makeup valve was closed at the 5.5 hour mark. The surfactant delay and redox delays were stopped at the 6 hour mark, followed by holding at temperature for 30 minutes. The reaction was then cooled to 35° C., transferred to a degasser to remove unreacted ethylene, and 2 g of Rhodaline 675 defoamer was added. The following properties of the resulting emulsion polymer were measured:

| | |
|---|---|
| Polymer Composition (By solids calculation) | 54% Ethylene 43.7% Vinyl acetate 2.3% Acrylic Acid |
| $T_g$ Onset (° C.) | −30.8 |
| Viscosity (60/12 rpm) (cps) | 1670/4610 |
| 100/325 mesh grit (ppm) | <103/<270 |
| % solids | 50.9 |
| pH | 4.8 |
| $T_m$ (° C.)/$H_f$ (J/g) | 90.6/17.8 |

EXAMPLE 16

Ethylene-vinyl Acetate-Acrylic Acid Polymer 1400 Psig Pressure, Staged Addition, High Temperature Thermal Initiator, Surfactant Stabilized, Seed Added This example demonstrates the use of polymer seeds (e.g., VINAC® 884 poly(vinyl acetate) supplied by Air Products Polymers, L.P.) to facilitate ethylene incorporation into the polymer at ethylene pressures below 2000 psig and the effect on heat seal performance.

A one-gallon stainless steel pressure reactor was charged with the following mixture:

| Material | Mass charged, g |
|---|---|
| DI Water | 1000 |
| Aerosol MA-80I | 10 |
| VINAC 884 poly(vinyl acetate) | 200 |
| Monomer Solution comprising 95 wt % vinyl acetate, and 5 wt % acrylic acid | 120 |

The following delay mixtures were utilized:

| Material | Mass charged, g |
|---|---|
| Aqueous 10.0% Ammonium persulfate containing 4% sodium bicarbonate | 129 |
| Aqueous solution containing 52.5 g Rhodacal DS-10 and 297.5 g water | 260 |
| Monomer Solution comprising 95 wt % vinyl acetate and 5 wt % acrylic acid | 540 |
| Ethylene | 1400 psig for 5.5 hours |

Agitation at 100 rpm was begun with a nitrogen purge. Agitation was then increased to 900 rpm and the reactor heated to 80° C. After pressurizing the reactor with ethylene to 1400 psig (9,754 kPa), 15 g of initiator was added to the reactor at a rate of 5.0 g/min and once these 15 g were in, the initiator rate was reduced to 0.30 g/min. After a 15 minute period, the surfactant delay was begun at 0.72 g/min and the monomer solution delay was begun at 3.0 g/min. Ethylene pressure of 1400 psig was maintained for 5.5 hours. The monomer solution delay was turned off at the 3 hour mark. The ethylene makeup valve was closed at the 5.5 hour mark. The surfactant delay and initiator delay were stopped at the 6 hour mark, followed by holding at temperature for 30 minutes. The reaction was then cooled to 35° C., transferred to a degasser to remove unreacted ethylene, and 2 g of Rhodaline 675 defoamer was added. The following properties of the resulting emulsion polymer were measured:

| | |
|---|---|
| Polymer Composition (By solids calculation) | 52% Ethylene 45.6% Vinyl acetate 2.4% Acrylic Acid |
| T$_g$ Onset (° C.) | −30.7 |
| Viscosity (60/12 rpm) (cps) | 652/1670 |
| 100/325 mesh grit (ppm) | <97/<202 |
| % solids | 51.8 |
| pH | 47 |
| T$_m$ (° C.)/H$_f$ (J/g) | 88.7/17.7 |

| | |
|---|---|
| Polymer Composition (By solids calculation) | 37.5% Ethylene 59.5% Vinyl acetate 3% Acrylic Acid |
| T$_g$ Onset (° C.) | −28.5 |
| Viscosity (60/12 rpm) (cps) | 130/188 |
| 100/325 mesh grit (ppm) | <120/<39 |
| % solids | 44.5 |
| pH | 4.3 |
| T$_m$(° C.)/H$_f$(J/g) | 79.8/8.4 |

EXAMPLE 17

Ethylene-Vinyl Acetate-Acrylic Acid Polymer 1400 Psig Pressure, Staged Addition, High Temperature Thermal Initiator, Surfactant Stabilized, No Seed This example demonstrates the effect of chain transfer agent on the polymer structure and heat seal performance for a thermally initiated process. A one-gallon stainless steel pressure reactor with the following mixture:

| Material | Mass charged, g |
|---|---|
| DI Water | 1100 |
| Aerosol MA-80I | 10 |
| Sodium citrate | 1 |
| Monomer Solution comprising 94.71 wt % vinyl acetate, 4.71 wt % acrylic acid, and 0.571 wt % dodecylmercaptan | 120 |

The following delay mixtures were utilized:

| Material | Mass charged, g |
|---|---|
| Aqueous 10.0% Ammonium persulfate containing 4% sodium bicarbonate | 64.5 |
| Aqueous solution containing 175 g Rhodacal UB and 175 g water | 260 |
| Monomer Solution comprising 94.71 wt % vinyl acetate, 4.71 wt % acrylic acid, and 0.571 wt % dodecylmercaptan | 540 |
| Ethylene | 1400 psig for 5.5 hours |

Agitation at 100 rpm was begun with a nitrogen purge. Agitation was then increased to 1000 rpm and the reactor heated to 80° C. After pressurizing the reactor with ethylene to 1400 psig (9,754 kPa), 20 g of initiator was added to the reactor at a rate of 1.0 g/min. Once these 20 g were in, the initiator rate was reduced to 0.30 g/min. and the surfactant delay was begun at 0.72 g/min and the monomer solution delay was begun at 3.0 g/min. Ethylene pressure of 1400 psig was maintained for 5.5 hours. At the 2 hour mark, the initiator delay rate was reduced to 0.15 g/min. The monomer solution delay and the initiator delay were turned off at the 3 hour mark. The ethylene makeup valve was closed at the 5.5 hour mark. The surfactant delay was stopped at the 6 hour mark, followed by holding at temperature for 30 minutes. The reaction was then cooled to 35° C., transferred to a degasser to remove unreacted ethylene, and 2 g of Rhodaline 675 defoamer was added. The following properties of the resulting emulsion polymer were measured:

EXAMPLE 18

Ethylene-Vinyl Acetate-Acrylic Acid Polymer 1400 Psig Pressure, Staged Addition, Low Temperature Redox Initiator, Hec/Surfactant Stabilized This example demonstrates another process for staged polymerization where both the monomer solution and ethylene are staged to alter the overall balance of polymer properties, and specifically in this example, to raise the T$_g$ of the amorphous regions of the polymer while still maintaining crystalline ethylene domains. A one-gallon stainless steel pressure reactor was charged with the following mixture:

| Material | Mass charged, g |
|---|---|
| DI Water | 700 |
| Rhodacal DS-10 | 9 |
| Natrosol 250GR (2% aqueous solution) | 500 |
| Ferrous ammonium sulfate (2% aqueous solution) | 6 |
| Monomer Solution comprising 94.71 wt % vinyl acetate, 4.71 wt % acrylic acid, and 0.571 wt % dodecylmercaptan | 120 |

The following delay mixtures were utilized:

| Material | Mass charged, g |
|---|---|
| Aqueous 4.0% t-BHP | 1.18 |
| Aqueous 8% sodium formaldehyde sulfoxylate | 127 |
| Aqueous solution containing 52.5 g Rhodacal DS-10 and 297.5 g water | 270 |
| Monomer Solution comprising 94.71 wt % vinyl acetate, 4.71 wt % acrylic acid, and 0.571 wt % dodecylmercaptan | 540 |
| Ethylene | 700 psig for 3 hours and 1400 psig for 2.5 hours |

Agitation at 100 rpm was begun with a nitrogen purge. Agitation was then increased to 900 rpm and the reactor heated to 60° C. After pressurizing the reactor with ethylene to 700 psig (4,928 kPa), 10 g of 8% aqueous sodium formaldehyde sulfoxylate was added to the reactor. Delay feeds of tert-butylhydrogen peroxide (4%) at 0.4 g/min. and 8% sodium formaldehyde sulfoxylate at 0.4 g/min were begun. At initiation, the surfactant delay was begun at 0.75 g/min and the monomer solution delay was begun at 3.0 g/min. Redox rates were adjusted during the reaction period to maintain reasonable reaction rates. Ethylene pressure of 700 psig (4,928 kPa) was maintained for 3 hours. At the 3 hour mark, the monomer solution delay was turned off and the ethylene pressure was increased to 1400 psig (9,754 kPa). At the 5.5 hour mark, the ethylene makeup valve was closed. The surfactant delay and redox delays were stopped at the 6 hour mark. The reaction was then cooled to 35° C., transferred to a degasser to remove unreacted ethylene, and 2 g of Rhodaline 675 defoamer was added. The following properties of the resulting emulsion polymer were measured:

| | |
|---|---|
| Polymer Composition (By solids calculation) | 34% Ethylene<br>63% Vinyl acetate<br>3% Acrylic Acid |
| $T_g$ Onset (° C.) | −8.9 |
| Viscosity (60/12 rpm) (cps) | 626/1320 |
| % solids | 39.1 |
| pH | 4.5 |
| $T_m$(° C.)/$H_f$(J/g) | 93.7/28.3 |

EXAMPLE 19

Ethylene-Vinyl Acetate-Acrylic Acid Polymer 1400 Psig Pressure, Staged Addition, Low Temperature Redox Initiator, Hec/Surfactant Stabilized This example demonstrates another process for staged polymerization where both the monomer solution and ethylene are staged to alter the overall balance of polymer properties, and specifically in this example, to raise the $T_g$ of the amorphous regions of the polymer while still maintaining crystalline ethylene domains. A one-gallon stainless steel pressure reactor was charged with the following mixture:

| Material | Mass charged, g |
|---|---|
| DI Water | 700 |
| Rhodacal DS-10 | 17 |
| Natrosol 250GR (2% aqueous solution) | 500 |
| Ferrous ammonium sulfate (2% aqueous solution) | 6 |
| Monomer Solution comprising 94.76 wt % vinyl acetate, 4.71 wt % acrylic acid, and 0.529 wt % dodecylmercaptan | 250 |

The following delay mixtures were utilized:

| Material | Mass charged, g |
|---|---|
| Aqueous 4.0% t-BHP | 124 |
| Aqueous 8% sodium formaldehyde sulfoxylate | 134 |
| Aqueous solution containing 52.5 g Rhodacal DS-10 and 297.5 g water | 264 |
| Monomer Solution comprising 94.76 wt % vinyl acetate, 4.71 wt % acrylic acid, and 0.529 wt % dodecylmercaptan | 540 |
| Ethylene | 400 psig for 3 hours and 1400 psig for 2.5 hours |

Agitation at 100 rpm was begun with a nitrogen purge. Agitation was then increased to 1000 rpm and the reactor heated to 60° C. After pressurizing the reactor with ethylene to 400 psig (2859 psig), 10 g of 8% aqueous sodium formaldehyde sulfoxylate was added to the reactor. Delay feeds of tert-butylhydrogen peroxide (4%) at 0.4 g/min. and 8% sodium formaldehyde sulfoxylate at 0.4 g/min were begun. At initiation, the surfactant delay was begun at 0.75 g/min and the monomer solution delay was begun at 3.0 g/min. Redox rates were adjusted during the reaction period to maintain reasonable reaction rates. Ethylene pressure of 400 psig was maintained for 3 hours. At the 3 hour mark, the monomer solution delay was turned off and the ethylene pressure was increased to 1400 psig (9,754 kPa). At the 5.5 hour mark, the ethylene makeup valve was closed. The surfactant delay and redox delays were stopped at the 6 hour mark. The reaction was then cooled to 35° C., transferred to a degasser to remove unreacted ethylene, and 2 g of Rhodaline 675 defoamer was added. The following properties of the resulting emulsion polymer were measured:

| | |
|---|---|
| Polymer Composition (By solids calculation) | 24% Ethylene<br>72.5% Vinyl acetate<br>3.5% Acrylic Acid |
| $T_g$Onset (° C.) | +10.7 |
| Viscosity (60/12 rpm) (cps) | 530/1160 |
| 100/325 mesh grit (ppm) | <300/<193 |
| % solids | 40.2 |
| pH | 4.2 |
| $T_m$(° C.)/$H_f$(J/g) | 95.3/24.1 |

COMPARATIVE EXAMPLE 20

Comparison of U.S. Pat. No. 6,319,978 Polymer

This example is provided to illustrate the differences in crystalline melting point and crystalline heat of fusion for pressures sensitive adhesives as described in U.S. Pat. No. 6,319,978 compared to the EVA polymers described herein. The comparative polymer was prepared by a method similar to the method disclosed in U.S. Pat. No. 6,319,978, Example 2. The polymerization pressure was 1400 psig (9,754 kPa) and the polymerization was effected at 80° C.

DSC analysis shows that a VAE emulsion polymer prepared by the method of U.S. Pat. No. 6,319,978 exhibits a very low $T_m$ (−2.5° C.) and low $H_f$ (11.5 J/g). However, it is clear from the DSC data that the VAE polymer emulsions containing crystalline ethylene segments as exemplified by Example 6 of this invention exhibit much higher crystalline melting points and much higher heats of fusion compared to the pressure sensitive adhesives disclosed in U.S. Pat. No. 6,319,978. The tensile storage modulus profile for a polymer of Example 6 of this invention, which contains a similar amount of ethylene (50 wt %) as the U.S. Pat. No. 6,319,978 sample, is clearly morphologically very different, since it has a much higher crystalline melting point and limited flow properties at elevated temperatures. Compositions described in U.S. Pat. No. 6,319,978, relating to pressure sensitive adhesives, obviously are essentially liquid at temperatures in excess of 115° C. The characteristics of the polymers described in this invention decrease room temperature tack as possessed by the pressure sensitive adhesives in U.S. Pat. No. 6,319,978 and allow for use in heat seal applications.

| Sample | Ethylene Content (wt %) | Crystalline Melting Point ($T_m$, °C.) | Crystalline Heat of Fusion (J/g) |
|---|---|---|---|
| U.S. Pat. No. 6,319,978* | 50 | −2.5 | 11.5 |
| Example 6 | 50 | 69.6 | 31.3 |
| Example 7 | 64 | 76.7 | 52.6 |
| Example 8 | 61 | 57.4 | 13.8 |
| Example 9 | 100 | 98.4 | 98.7 |
| Example 10 | 83 | 96.7 | 72.5 |
| Per Example 1** | 68 | 73.7 | 38.1 |
| Per Example 8*** | 63 | 68.4 | 26.8 |

*preparation similar to procedure of Ex. 2, U.S. Pat. No. 6,319,978
**prepared according to the procedure of Example 1
***prepared according to the procedure of Example 8

Although the polymer formed by the method of Example 2 in '978 is similar in composition, e.g., concentration of vinyl acetate and ethylene to that of Example 6, the property difference is largely attributed to crystalline ethylene domains as reflected in the $T_m$ above room temperature, $H_f$, and tensile storage modulus at elevated temperatures.

COMPARATIVE EXAMPLE 21

Comparison of Polymer Disclosed in U.S. Pat. No. 5,747,578 (Example 9)

Example 9 of U.S. Pat. No. 5,747,578 was chosen for comparative purposes because the polymer generated in the first phase of the polymerization is believed to represent the closest example to the subject of this invention. When the polymer is considered as a whole, it too is a modified core/shell polymer but the core/shell components are different compared to the staged polymerizations as illustrated in Example 10.

The polymer in Example 9 of U.S. Pat. No. 5,747,578 was reproduced in a one-gallon pressure reactor. Since Texapon K12 and Arkopal N300 were unavailable, their active surfactant ingredient equivalents, Rhodapon UB and Igepal CO-887, respectively, were used. Further, the procedure is ambiguous in terms of when exactly to begin ethylene pressurization. Specifically, it states at col. 12, line 65 to col. 13, line 4: ". . . 640 ml of vinyl acetate are metered in and the contents of the tank are heated to 40° C. 250 ml of an initiator solution of 50 g ammonium peroxodisulfate and 1000 g water are added rapidly at this temperature and the temperature is then increased to 60° C. During the heating-up phase, ethylene is forced in up to a pressure of 85 bar."

Due to the described ambiguity, Example 9 was reproduced in a manner that would maximize the chances of producing an emulsion copolymer containing ethylene crystallinity. A calculation was performed which determined the weight of ethylene necessary to achieve 85 bar in a one-gallon reactor containing the initial reactor charges at a temperature of 60° C. This number was calculated to be 415 g of ethylene. As such, the comparative experiment was completed as follows:

A one-gallon reactor was purged with nitrogen and ethylene, and then charged with 353.1 g Celvol 205 (20% aqueous solution) poly(vinyl alcohol), 706 g Celvol 523 (10% aqueous solutions) poly(vinyl alcohol), 464.7 g deionized water, 1.8 g Rhodapon UB (30%), 13.6 g Igepal CO-887 (70%), 1.56 g sodium metabisulfite, and 6.35 g sodium acetate. Agitation was begun at 100 rpm followed by the addition of 74.7 g of vinyl acetate. The reactor was then purged again. Agitation was increased to 1000 rpm and the reactor was heated to 40° C.; 415 g of ethylene was then charged to the reactor resulting in a pressure of approximately 980 psig (6,858 kPa). 31.25 g of 4.8% aqueous ammonium persulfate was added to the reactor rapidly. The reactor temperature was then increased to 60° C. which resulted in a maximum ethylene pressure of 1249 psig (8,713 kPa). The ethylene pressure control was set at 1233 psig (8,603 kPa). Once the 60° C. temperature was reached, a vinyl acetate delay at 0.97 g/min and a 4.8% aqueous ammonium persulfate delay at 0.14 g/min were begun. The ethylene supply was stopped 6 hours after beginning the vinyl acetate delay. Eight hours after beginning the vinyl acetate delay, the rate was increased to 1.94 g/min. Nine hours after beginning the vinyl acetate delay, the persulfate delay and vinyl acetate delay were stopped. At this point, 18.75 g of 4.8% aqueous ammonium persulfate was added to the reactor rapidly. The reactor temperature was then linearly increased over the next 1.5 hours to 85° C., followed by holding at this temperature for another hour. The contents of the reactor were cooled and transferred to a degasser tank.

The procedure outlined above was repeated, except the reaction was stopped at the end of the first polymer phase. A one-gallon reactor was purged with nitrogen and ethylene, and then charged with 353.1 g Celvol 205 (20% aqueous solution), 706 g Celvol 523 (10% aqueous solutions), 464.7 g deionized water, 1.8 g Rhodapon UB (30%), 13.6 g Igepal CO-887 (70%), 1.56 g sodium metabisulfite, and 6.35 g sodium acetate. Agitation was begun at 100 rpm followed by the addition of 74.7 g of vinyl acetate. The reactor was then purged again. Agitation was increased to 1000 rpm and the reactor was heated to 40° C. 415 g of ethylene was then charged to the reactor which resulted in a pressure of 987 psig (6,907 kPa). 31.25 g of 4.8% aqueous ammonium persulfate was added to the reactor rapidly. The reactor temperature was then increased to 60° C. which resulted in a maximum ethylene pressure of 1247 psig. The ethylene pressure control was set at 1233 psig (8603 kPa). Once the 60° C. temperature was reached, a vinyl acetate delay at 0.97 g/min and a 4.8% aqueous ammonium persulfate delay at 0.14 g/min were begun. The ethylene supply was stopped 6 hours after beginning the vinyl acetate delay. Eight hours after beginning the vinyl acetate delay, the persulfate delay and the vinyl acetate delay were stopped. At this point, 18.75 g of 4.8% aqueous ammonium persulfate was added to the reactor rapidly. The reactor temperature was then linearly increased over the next 1.5 hours to 85 ° C., followed by holding at this temperature for another hour. The contents of the reactor were cooled and transferred to a degasser tank.

A representative polymer of this invention was prepared by the following procedure: A one-gallon stainless steel pressure reactor was charged with the following mixture:

| Material | Mass charged, g |
|---|---|
| DI Water | 500 |
| Rhodacal DS-10 | 9 |
| Natrosol 250GR HEC | 500 |
| Ferrous ammonium sulfate (2% solution in water) | 6 |
| Monomer solution containing 94.2 wt % vinyl acetate, 4.7 wt % acrylic acid, and 1.1% dodecyl mercaptan | 120 |

The following delay mixtures were utilized:

| Material | Mass charged, g |
| --- | --- |
| Aqueous 4.0% t-BHP | 137 |
| Aqueous 8% sodium formaldehyde sulfoxylate | 137 |
| Aqueous solution containing 52.5 g Rhodacal DS-10 and 297.5 g water | 289 |
| Monomer solution containing 94.2 wt % vinyl acetate, 4.7 wt % acrylic acid, and 1.1% dodecyl mercaptan | 541 |
| Ethylene | 1400 psig for 5.5 hours |

The pH of the initially charged mixture was adjusted to 4.0 with acetic acid. Agitation at 100 rpm was begun with a nitrogen purge followed by addition of the initial monomer solution. Agitation was then increased to 900 rpm and the reactor heated to 60° C. The reactor was then pressurized with ethylene to 1400 psig (9,754 kPa). 10 g of sodium formaldehyde sulfoxylate solution was then added. Delay feeds of tert-butylhydrogen peroxide at 0.4 g/min. and sodium formaldehyde sulfoxylate at 0.4 g/min were begun. After a 10 minute period, the monomer solution delay was begun at 3.0 g/min and the surfactant delay was begun at 0.80 g/min. Ethylene pressure of 1400 psig was maintained for 5.5 hours. At the 2 hour mark, the tert-butylhydrogen peroxide and sodium formaldehyde sulfoxylate delay rates were reduced to 0.3 g/min. The monomer solution delay was stopped at the 3 hour mark. The ethylene makeup valve was closed at the 5.5 hour mark. The surfactant delay and redox delays were stopped at the 6 hour mark. Next, the reaction was cooled to 35° C. and transferred to a degasser, and 2 g of Rhodaline 675 defoamer was added.

The following properties of the resulting emulsion copolymer were measured:

| | |
| --- | --- |
| Copolymer Composition (by solids calculation) | 39% Ethylene 58.1% VAM 2.9% Acrylic Acid |
| $T_g$ Onset (° C.) | −29.1 |
| Viscosity (60/12 rpm) (cps) | 970/2580 |
| 100/325 mesh coagulum (ppm) | 143/60 |
| % solids | 43.7 |
| pH | 4.36 |
| $T_m$ (° C.)/$H_f$ (J/g) | 84/28.5 |

The properties of the two polymers produced by the procedure of Example 9 (U.S. Pat. No. 5,747,578) and the polymer prepared by the method of this invention are summarized in the table below:

| | U.S. Pat. No. 5747578, Example 9 (Full Example) | U.S. Pat. No. 5747578, Example 9 (First Phase Polymer) | Example of Invention |
| --- | --- | --- | --- |
| Ethylene Content | 32.5% | 36% | 39% |
| Viscosity (60 rpm, cps) | >10,000 | >10,000 | 970 |
| $T_g$ (onset) | −24.9° C. | −30.3° C. | −29.1° C. |
| $T_m$ (ethylene) | None Detected[a] | None Detected[b] | 84° C. |
| $H_f$ (J/g) | — | — | 28.5 |
| Reactor Yield | 21% | 29.7% | 81% |
| pH | 4.68 | 4.81 | 4.36 |
| Solids Content | 42.9% | 40.2% | 43.7% |

[a] Melting point due to poly(vinyl alcohol) observed at approximately 190° C.
[b] Melting point due to poly(vinyl alcohol) observed at approximately 180° C.

It is clear, based on the observations during the emulsion polymerization and the properties of the final product, that the compositions of this invention are completely different than the polymers described in U.S. Pat. No. 5,747,578. During the reproduction of the polymer according to Example 9 in U.S. Pat. No. 5,747,578, it was observed that very little ethylene was consumed as noted by the few times the ethylene valve had to be opened in order to maintain 85 bar pressure. Most notably, the compositions prepared following the procedure described in Example 9 in U.S. Pat. No. 5,747,578 (including the first phase polymer) do not contain any crystalline ethylene segments as determined by DSC. The only observed crystallinity was due to the presence of poly(vinyl alcohol), which is inherently crystalline. The highly viscous material prepared from Example 9 in U.S. Pat. No. 5,747,578 resulted in very poor reactor yields. On the other hand, the compositions of this invention contain significant amounts of ethylene crystallinity as indicated by the DSC observation of a melting point and heat of fusion.

It is believed two reasons account for the differences between these polymers. A first difference is that poly(vinyl alcohol) was used as the protective colloid and second, sodium metabisulfite was used as the initiator. It is believed that significant amounts of batched poly(vinyl alcohol) limits ethylene solubility in the emulsion polymerization reaction medium, limits formation of crystalline ethylene segments, and leads to higher viscosity reaction medium thus hindering efficient mixing of ethylene into the reaction medium. Sodium metabisulfite as an initiator appears ineffective to create the free radical flux necessary for the formation of crystalline ethylene domains.

COMPARATIVE EXAMPLE 22

Polymer Disclosed in U.S. Pat. No. 3,692,723 (Example 18)

The polymertype of Example 18 of U.S. Pat. No. 3,692,723 (Denki) was reproduced in a one-gallon pressure reactor increasing the batch size by a factor of four. The reactor was purged with nitrogen and ethylene, and then charged with 120 g Celvol 540 (10% aqueous solution), 587.9 g deionized water, 11.5 g Igepal CO-897 (70%), 66.7 g Rhodapon UB (30%) sodium lauryl sulfate, 6 g sodium dihydrogen phosphate, and 8 g sodium persulfate. Agitation was begun at 100 rpm followed by the addition of 228 g of vinyl acetate. The reactor was then purged again. Agitation was increased to 1000 rpm, the reactor was heated to 60° C., and pressurized with ethylene to 142 psig (1,080 kPa). Once the reactor was at temperature, the ethylene pressure was increased to 1422 psig (9,906 kPa). The reactor temperature was then held at 60° C. for 2 hours while maintaining an ethylene pressure of 1422 psig (9,906 kPa). The ethylene supply was then stopped and the contents of the reactor were cooled and transferred to a degasser tank. The procedure outlined above was repeated again, except the reaction was conducted at an ethylene pressure of approximately 1850 psig (12,857 kPa) instead of 1422 psig (9,906 kPa). The results of these two comparative runs are summarized in the table below.

|  | U.S. Pat. No. 3692723, Example #18 (1422 psig) | U.S. Pat. No. 3692723, Example #18 (1850 psig) |
|---|---|---|
| Ethylene Content | ?* | ?* |
| Viscosity (60 rpm, cps) | 263 | 570 |
| $T_g$ (onset) | −36.3° C. | −36.5° C. |
| $T_m$ (ethylene) | 39° C. | 46.7 |
| $H_f$ (J/g) | 6.1 | 16.0 |
| pH | 6.1 | 6.0 |
| Solids Content | 24.7% | 22.3% |
| Residual vinyl acetate monomer (VAM) | 1.6% | 3% |

-continued

|  | U.S. Pat. No. 3692723, Example #18 (1422 psig) | U.S. Pat. No. 3692723, Example #18 (1850 psig) |
|---|---|---|
| 325 Grit | 54 | 376 |
| 100 Grit | 63 | 308 |
| Non-Block | PASS | PASS |
| HGS | 0 | 0 |
| Fiber Tear | 75% | 0 |

*Mass balance calculation resulted in negative ethylene consumption, probably due to material hang up in the reactor.

A summary of the conditions of polymerization and the results of various tests, such as blocking, heat seal, hot green strength (HGS), and tensile storage modulus (E'), for the examples, are presented in the table below:

| Ex | Profile | % VAM | % E | % AA | Colloid | Anionic | Nonionic | Pressure, psig | Temp ° C. | Initiator |
|---|---|---|---|---|---|---|---|---|---|---|
| 1 | U | 15 | 85 | 0 | HEC | SLS |  | 1800 | 80 | pers |
| 2a | U | 33 | 67 | 0 | HEC | SLS |  | 1800 | 80 | pers |
| 3a | U | 9 | 91 | 0 | HEC | SLS |  | 1800 | 80 | pers |
| 4a | U | 24 | 76 | 0 | HEC | SLS |  | 1800 | 80 | pers |
| 5a | U | 1.7 | 96.6 | 1.7 | HEC | SLS |  | 1800 | 80 | pers |
| 6a | U | 34.7 | 64.1 | 1.2 | HEC | SLS |  | 1800 | 80 | pers |
| 7a | U | 24.6 | 74.7 | 0.6 | HEC | SLS |  | 1800 | 80 | pers |
| 8a | U | 34.4 | 65 | 0.6 | HEC | SLS |  | 1800 | 80 | pers |
| 2 | U | 30 | 70 | 0 | PVOH | SLS |  | 1800 | 80 | pers |
| 3 | U | 50 | 50 | 0 | HEC |  | Triton; Igepal | 1800 | 60 | tBHP/SFS |
| 4 | U | 35 | 65 | 0 | HEC | SLS/SVS | Igepal | 1800 | 85 | pers |
| 5 | S | 26 | 74 | 0 | HEC | SLS |  | 1400 | 80 | pers |
| 6 | U | 46.5 | 50 | 3.5 | HEC | SLS |  | 1600 | 60 | tBHP/SFS |
| 7 | U[b] | 27.5 | 63.5 | 3 | HEC | SLS |  | 1500 | 60 | tBHP/SFS |
| 8 | U | 35 | 61 | 4 | HEC | SLS |  | 1800 | 80 | pers |
| 9 | U | 0 | 100 | 0 |  | SLS |  | 1800 | 80 | pers |
| 10 | S | 17 | 83 | 0 | HEC | SLS |  | 1800 | 80 | pers |
| 11 | S | 46.5 | 51 | 2.5 |  | DS10/MA80I |  | 1400 | 80 | pers |
| 12 | S | 56 | 41 | 3 | HEC | DS10 |  | 1400 | 60 | tBHP/SFS |
| 13 | S | 25.7 | 74 | 0.6 | HEC | SLS |  | 1400 | 80 | pers |
| 14 | S | 55 | 42.5 | 2.5 | HEC | DS10 |  | 1400 | 60 | redox |
| 15 | S | 43.7 | 54 | 2.3 |  | SLS/MA80I |  | 1400 | 80 | pers |
| 16 | S[c] | 45.6 | 52 | 2.4 |  | DS10/MA80I |  | 1400 | 80 | pers |
| 17 | S | 59.5 | 37.5 | 3 |  | DS10/MA80I |  | 1400 | 80 | pers |
| 18 | S | 63 | 34 | 3 | HEC | DS10 |  | 1400 | 60 | tBHP/SFS |
| 19 | S | 72.5 | 24 | 3.5 | HEC | DS10 |  | 1400 | 60 | tBHP/SFS |
| 20 |  | 48 | 50 | 1.5 |  | Polystep-B27 | Igepal | 1400 | 85 | pers |
| 21[d] | S | 64 | 36 |  | PVOH | SLS | Igepal | 1233 | 60 | pers |
| 21[e] | S | 67.5 | 32.5 |  | PVOH | SLS | Igepal | 1233 | 60 | pers |
| 22 | B | ? |  |  | PVOH | SLS | Igepal | 1422 | 60 | pers |
| 22 | B | ? |  |  | PVOH | SLS | Igepal | 1850 | 60 | pers |

| Ex | % Initiator* | Onset $T_g$, ° C., | $T_m$, ° C. | $H_f$ J/g | Heat Seal | Block | HGS** | E' (115° C.) |
|---|---|---|---|---|---|---|---|---|
| 1 | 1 | −36.3 | 86.7 | 55.3 | 0 | pass | ND | 1.2E+05 |
| 2a | 0.73 | −39.6 | 66 | 44.3 | 0 | pass | ND | 1.4E+05 |
| 3a | 1.2 | −41.8 | 90 | 65.1 | 0 | pass | ND | ND |
| 4a | 0.8 | −38.2 | 76 | 45.2 | 0 | pass | ND | 1.60E+05 |
| 5a |  |  | 97 | 82 |  |  | ND | ND |
| 6a | 0.8 | −37.8 | 58 | 38.3 | 100 | pass | 0 | 5.7E+04 |

-continued

| | | | | | | | | |
|---|---|---|---|---|---|---|---|---|
| 7a | 0.82 | −37 | 77 | 44.3 | 100 | pass | 0 | 1.1E+05 |
| 8a | 0.78 | −36.2 | 67 | 32.1 | 100 | pass | ND | 1.0E+05 |
| 2 | 0.88 | −40.5 | 69 | 42 | 75 | pass | ND | 4.30E+05 |
| 3 | 0.94 | −38.4 | 40 | 35.4 | 0 | fail | ND | ND |
| 4 | 1.22 | −45 | 66 | 41.6 | 0 | pass | ND | ND |
| 5 | 0.8 | −33.4 | 95 | 52.5 | 100 | pass | 0 | 9.1E+04 |
| 6 | 0.5 | −29.3 | 70 | 31.3 | 100 | pass | 50% | 1.0E+06 |
| 7 | 0.5 | −31.6 | 95 | 52.6 | 100 | pass | 50% | 1.1E+06 |
| 8 | 0.8 | −33.7 | 57 | 13.8 | 100 | pass | 10% | ND |
| 9 | 2.5 | none | 98 | 98.7 | ND | ND | ND | ND |
| 10 | 0.7 | −35.6 | 97 | 72.5 | 100 | pass | 50% | 3.4E+05 |
| 11 | 1 | −29.9 | 87 | 23.6 | 100 | pass | 75% | 5.3E+05 |
| 12 | 0.5 | −27.4 | 91 | 25.7 | 100 | fail | 100% | 1.4E+06 |
| 13 | 0.9 | −33.4 | 95 | 51.6 | 100 | pass | 75% | 4.9E+05 |
| 14 | 0.4 | −27.1 | 89.9 | 15.8 | 100 | PASS | 100% | 1.0E+06 |
| 15 | 0.9 | −30.8 | 90.6 | 17.8 | 100 | PASS | 50% | 7.9E+05 |
| 16 | 0.9 | −30.7 | 88.7 | 17.7 | 100 | PASS | 25% | 6.2E+05 |
| 17 | 0.6 | −28.5 | 79.8 | 8.4 | 100 | PASS | 100% | ND |
| 18 | 0.47 | −8.9 | 93.7 | 28.3 | 100 | PASS | 100% | 1.4E+06 |
| 19 | 0.47 | +10.7 | 95.3 | 24.1 | 100 | PASS | 100% | 1.5E+06 |
| 20 | | −31 | −2.5 | 11.5 | | | | |
| 21[d] | | −30.3 | none | none | | | | |
| 21[e] | | −24.9 | none | none | | | | |
| 22 | | −36.3 | 39 | 6.1 | 75 | pass | 0 | |
| 22 | | −36.5 | 46.7 | 16 | 0 | pass | 0 | |

*% initiator refers to weight percent oxidizer relative to total monomer
**% Fiber tear while the heat sealed bond is still warm
[b]VAM seed
[c]VINAC 884 poly(vinyl acetate) seed
[d]first phase polymer
[e]full example polymer Examples 1, and 2a–4a have desirable thermal melting points and heats of fusion. Although the 99° C. heat seal data were not supportive, it is believed that these compositions require higher heat seal temperatures to effect adhesion. Heat seal data for some of these samples at 109° C. did give some adhesion.

Examples 5a–8a are similar in polymerization procedure to Examples 1–4a but incorporate acrylic acid. These polymers pass the heat seal test by giving a fiber tearing bond once the substrate is cooled to room temperature. This is probably because of the adhesion promoting effect of the acrylic acid.

Examples 5 and 10 illustrate staged addition of vinyl acetate as opposed to delay addition of vinyl acetate and the absence of acrylic acid on heat sealability and hot green strength. The heat of fusion and tensile storage modulus was lower for Example 5 than Example 10 and may have resulted from the lower polymerization pressure.

Examples 6, 7, and 8 compare redox initiation and thermal initiation of vinyl acetate and ethylene in the presence of high levels of acrylic acid. It may be that the higher thermal melt temperature and heats of fusion for Examples 6 and 7 resulted from the lower polymerization temperature and higher ethylene solubility at the lower temperature. Examples 6 and 7 also used poly(vinyl acetate) (PVAc) seed and this seed is included in the total polymer composition ratio.

Polymer emulsions of Examples 6, 8, and 13 were pH adjusted with 10% sodium hydroxide solution and this yielded polymers that exhibited higher hot green strength in polymers containing acid functionality compared to the same polymers in a more acidic state. It is postulated that the ionomer associations of neutralized acid groups increase the strength of the heat seal bond at elevated temperatures. The hot green strength at two pH levels are presented in the table below:

| Sample | Polymer Composition % E/% VA/% AA | Hot Green Strength (% Fiber Tear) | |
|---|---|---|---|
| | | pH = 4 | pH = 7 |
| Example 6 | 64.1/34.7/1.2 | 50 | 75 |
| Example 8 | 65/34.4/0.6 | 10 | 25 |
| Example 13 | 74/25.7/.3 | 0 | 75 |

Examples 11–15 versus Examples 6–8 illustrate the effect of staged polymerization versus uniform or delay addition of vinyl acetate. Comparable thermal properties were obtained even though the polymerization pressure was much lower for Examples 11–15. High tensile storage modulus polymers also were obtained. It is believed that staging the polymerization allowing for most of the ethylene crystalline domains to form in the later stage of polymerization accounts for the high tensile storage modulus and similar melting temperatures.

Comparative Example 20 is preparation of a polymer by a method similar to the method of Example 2 of U.S. Pat. No. 6,319,978. The $T_m$ of −2.5° C. for a pressure sensitive adhesive is indicative that it is not suited for use as a heat seal adhesive because it obviously would not have any non-blocking characteristics.

Comparative Example 21, which is an attempt of a repeat of Example 9 in U.S. Pat. No. 5,747,578, shows that an adhesive was formed which did not have a thermal melt temperature or a heat of fusion. Also, poly(vinyl alcohol) was used as a stabilizing protective colloid.

Comparative Example 22 was a repeat of Example 18 of U.S. Pat. No. 3,692,723 (Denki), in which poly(vinyl alcohol) was used as the stabilizing colloid. It resulted in a polymer that had a $T_m$ and $H_f$. But, it is rejected for several reasons: 1) the batched poly(vinyl alcohol) stabilizing system, 2) limited incorporation of ethylene during the polymerization, 3) unsuitable reaction temperature for thermally initiated emulsion polymerization resulting in non constant and declining radical flux and thus limited formation of crystalline ethylene segments, and 4) poor heat seal characteristics.

What is claimed is:

1. An ethylene-vinyl acetate polymer emulsion suited for use in heat seal applications said ethylene-vinyl acetate polymer comprised of crystalline ethylene segments prepared by emulsion polymerizing ethylene and vinyl acetate in the presence of a stabilizing system consisting essentially of a surfactant or a cellulosic protective colloid in combination with a surfactant, said ethylene-vinyl acetate polymer having:
   (a) a crystalline melting point ranging from 35 to 110° C. as measured at a heat rate of 20° per minute; and,
   (b) a tensile storage modulus of at least $1 \times 10^5$ dynes/cm$^2$ at a temperature of 115° and measured at 6.28 rad/sec.

2. The polymer emulsion of claim 1 wherein the polymer is comprised of from 15 to 90% by weight of polymerized units of vinyl acetate and from about 10 to 85% by weight of polymerized units of ethylene based upon the total weight of the polymer.

3. The polymer emulsion of claim 1 wherein the polymer is comprised of from 25 to 80% by weight of polymerized units of vinyl acetate and from about 20 to 75% by weight of polymerized units of ethylene based upon the total weight of the polymer.

4. The polymer emulsion of claim 1 wherein the polymer is comprised of from 35 to 75% by weight of polymerized units of vinyl acetate and from about 25 to 65% by weight of polymerized units of ethylene based upon the total weight of the polymer.

5. The polymer emulsion of claim 1 wherein the polymer is comprised of from 30 to 50% by weight of polymerized units of vinyl acetate and from about 50 to 70% by weight of polymerized units of ethylene based upon the total weight of the polymer.

6. The polymer emulsion of claim 2 wherein polymerized carboxylic acid units are present in said polymer in an amount from about 0.2 to about 10% by weight of said polymer.

7. The polymer emulsion of claim 6 wherein said polymer has a tensile storage modulus of at least $2 \times 10^5$ dynes/cm$^2$ at 115° and measured at 6.28 rad/sec.

8. The polymer emulsion of claim 7 wherein the polymer is comprised of polymerized units of ethylene, vinyl acetate, and acrylic acid.

9. The polymer emulsion of claim 7 wherein the crystalline heat of fusion of said polymer is from about 5 to 100 joules per gram as measured at a heat rate of 20° C. per minute.

10. The polymer emulsion of claim 7 wherein the glass transition temperature is from +25° C. to about −35° C. as measured at a heat rate of 20° C. per minute.

11. The polymer emulsion of claim 8 wherein crystalline thermal melting point ranges from 50 to 90° C. as measured at a heat rate of 20° C. per minute.

12. The polymer emulsion of claim 8 wherein a portion of the emulsion polymerization is carried out at a pressure of from 1000 to 2000 psig (6,996 to 13,891 kPa).

13. The polymer emulsion of claim 12 wherein the stabilizing system consists essentially of hydroxyethyl cellulose in combination with a surfactant.

14. The polymer emulsion of claim 13 wherein the vinyl acetate is present in an amount from 15 to 90% by weight, the ethylene is present in an amount from 10 to 85% by weight, and the acrylic acid is present in an amount from 0.5 to 5% by weight of the polymer.

15. The polymer emulsion of claim 14 wherein the crystalline heat of fusion ranges from preferably 15 to 70 joules per gram as measured at a heat rate of 20° C. per minute.

16. The polymer emulsion of claim 1, wherein polymerized units of acrylamide or Veova-10 ester are present in said ethylene-vinyl acetate polymer.

17. The polymer emulsion of claim 1, wherein a chain transfer agent is used during emulsion polymerization.

18. A process for making an aqueous semi-crystalline ethylene vinyl acetate polymer emulsion which comprises reacting vinyl acetate and ethylene with optionally one or more other ethylenically unsaturated monomer, under emulsion polymerization conditions in the presence of a stabilizing system consisting essentially of a surfactant or a cellulosic protective colloid in combination with a surfactant, said ethylene-vinyl acetate polymer having:
   (a) a crystalline melting point ranging from 35 to 110° C. as measured at a heat rate of 20° C. per minute; and,
   (b) a tensile storage modulus of at least $1 \times 10^5$ dynes/cm$^2$ at a temperature of 115° C. and measured at 6.28 rad/sec.

19. The process of claim 18 wherein the addition of monomers, except ethylene, to the emulsion polymerization are completed within the first 75% of the total reaction time.

20. The process of claim 18 wherein a portion of the process is carried out at pressures of from 1000 to 2000 psig (6,996 to 13,891 kPa).

21. The process of claim 18, wherein the one or more other ethylenically unsaturated monomer is selected from the group comprising acrylamide and Veova-10 ester.

22. The process of claim 18, wherein a chain transfer agent is used during emulsion polymerization.

23. A process for forming a paper stock for heat seal application which comprises:
   coating a paper substrate with a polymer emulsion comprising emulsion polymerized units of vinyl acetate and ethylene with one or more other ethylenically unsaturated monomer, wherein said polymer emulsion is stabilized with a stabilizing system consisting essentially of a surfactant or a cellulosic protective colloid in combination with a surfactant, said polymer containing crystalline ethylene segments and having (a) a crystalline melting point ranging from 35 to 110° C. as measured at a heat rate of 20° C. per minute; and, (b) a tensile storage modulus of at least $1 \times 10^5$ dynes/cm$^2$ at a temperature of 115° C. and measured at 6.28 rad/sec; and then,
   drying the coating, said dried coating being non-blocking at ambient temperature.

24. A multi-layer heat sealable material comprising
   (a) at least one substrate; and
   (b) at least one coating of a polymer emulsion comprising emulsion polymerized units of vinyl acetate and ethylene with one or more other ethylenically unsaturated monomer, wherein said polymer emulsion is stabilized with a stabilizing system consisting essentially of surfactant or a cellulosic protective colloid in combination with surfactant, said polymer containing crystalline ethylene segments and having (a) a crystalline melting point ranging from 35 to 110° C. measured at a heat rate of 20° C. per minute; and, (b) a tensile storage modulus of at least $1 \times 10^5$ dynes/cm$^2$ at a temperature of 115° C. and measured at 6.28 rad/sec.

* * * * *

UNITED STATES PATENT AND TRADEMARK OFFICE
CERTIFICATE OF CORRECTION

PATENT NO. : 7,189,461 B2 Page 1 of 1
APPLICATION NO. : 10/378996
DATED : March 13, 2007
INVENTOR(S) : Rabasco et al.

It is certified that error appears in the above-identified patent and that said Letters Patent is hereby corrected as shown below:

Column 37, Line 17

Insert -- C -- after "20°"

Column 37, Line 19

Insert -- C -- after "115°"

Column 37, Line 45

Insert -- C -- after "115°"

Signed and Sealed this

Twenty-second Day of May, 2007

JON W. DUDAS
*Director of the United States Patent and Trademark Office*